United States Patent
Sandler et al.

(10) Patent No.: US 10,245,204 B2
(45) Date of Patent: Apr. 2, 2019

(54) DEVICES AND METHODS FOR IMPROVING THE UTILITY OF AN EXOSKELETON MOBILITY BASE

(71) Applicant: Ekso Bionics, Inc., Richmond, CA (US)

(72) Inventors: Reuben Sandler, Berkeley, CA (US); Renata Smith, Berkeley, CA (US); Chris Meadows, Richmond, CA (US); Rochelle Rea, Oakland, CA (US); Jared Jones, Oakland, CA (US); Matt Sweeney, Sacramento, CA (US)

(73) Assignee: Ekso Bionics, Inc., Richmond, CA (US)

( * ) Notice: Subject to any disclaimer, the term of this patent is extended or adjusted under 35 U.S.C. 154(b) by 75 days.

(21) Appl. No.: 15/260,577

(22) Filed: Sep. 9, 2016

(65) Prior Publication Data
US 2017/0071812 A1   Mar. 16, 2017

Related U.S. Application Data

(60) Provisional application No. 62/217,085, filed on Sep. 11, 2015.

(51) Int. Cl.
| | |
|---|---|
| *A61H 3/00* | (2006.01) |
| *A61G 5/14* | (2006.01) |
| *A61H 1/02* | (2006.01) |
| *A61H 3/04* | (2006.01) |
| *H01M 2/10* | (2006.01) |
| *A61G 7/10* | (2006.01) |
| *A61G 5/06* | (2006.01) |
| *A61G 5/10* | (2006.01) |

(52) U.S. Cl.
CPC ............... *A61H 3/00* (2013.01); *A61G 5/066* (2013.01); *A61G 5/14* (2013.01); *A61G 7/10* (2013.01); *A61H 1/024* (2013.01); *A61H 1/0244* (2013.01); *A61H 1/0255* (2013.01); *A61H 1/0274* (2013.01); *A61H 3/04* (2013.01); *H01M 2/1016* (2013.01); *H01M 2/1072* (2013.01); *A61G 5/1054* (2016.11); *A61H 2201/0107* (2013.01); *A61H 2201/163* (2013.01); *A61H 2201/1635* (2013.01); *A61H 2201/1642* (2013.01)

(58) Field of Classification Search
CPC .... A61H 2003/043; A61H 3/04; A61H 3/008; A63B 21/00
See application file for complete search history.

(56) References Cited

U.S. PATENT DOCUMENTS

| | | |
|---|---|---|
| 2,592,023 A | 4/1952 | Gleason |
| 3,463,146 A | 8/1969 | Schwartz et al. |
| 3,631,542 A | 1/1972 | Potter |

(Continued)

*Primary Examiner* — James A Shriver, II
*Assistant Examiner* — James J Triggs
(74) *Attorney, Agent, or Firm* — Diederiks & Whitelaw, PLC.

(57) ABSTRACT

A mobility system includes an energy module, an exoskeleton and a mobile base. The exoskeleton has an exoskeleton energy module receptacle that can receive the energy module, and the mobile base has a mobile base energy module receptacle that can also receive the energy module. In addition, the mobile base has an exoskeleton support that can support the exoskeleton on the mobile base so that the mobile base can transport the exoskeleton across a support surface.

43 Claims, 36 Drawing Sheets

(56) References Cited

U.S. PATENT DOCUMENTS

| | | | |
|---|---|---|---|
| 4,077,483 A | 3/1978 | Randolph | |
| 5,609,348 A | 3/1997 | Galumbeck | |
| 6,076,619 A | 6/2000 | Hammer | |
| 6,263,989 B1 | 7/2001 | Won | |
| 7,316,405 B2 | 1/2008 | Kritman et al. | |
| 7,367,958 B2 | 5/2008 | McBean et al. | |
| 7,938,756 B2 | 5/2011 | Rodetsky et al. | |
| 8,333,256 B2 | 12/2012 | Stolkin et al. | |
| 8,790,284 B2 | 7/2014 | Jeon et al. | |
| 8,942,846 B2 | 1/2015 | Jacobsen et al. | |
| 9,224,993 B2 | 12/2015 | Hamaya et al. | |
| 2011/0066088 A1* | 3/2011 | Little | B25J 9/0006 601/35 |
| 2012/0172770 A1 | 7/2012 | Almesfer et al. | |
| 2014/0142475 A1 | 5/2014 | Goldfarb et al. | |
| 2015/0060162 A1* | 3/2015 | Goffer | A61G 5/12 180/41 |
| 2015/0283009 A1 | 10/2015 | Borisoff et al. | |
| 2016/0045382 A1 | 2/2016 | Goffer | |
| 2016/0067137 A1 | 3/2016 | Little et al. | |

\* cited by examiner

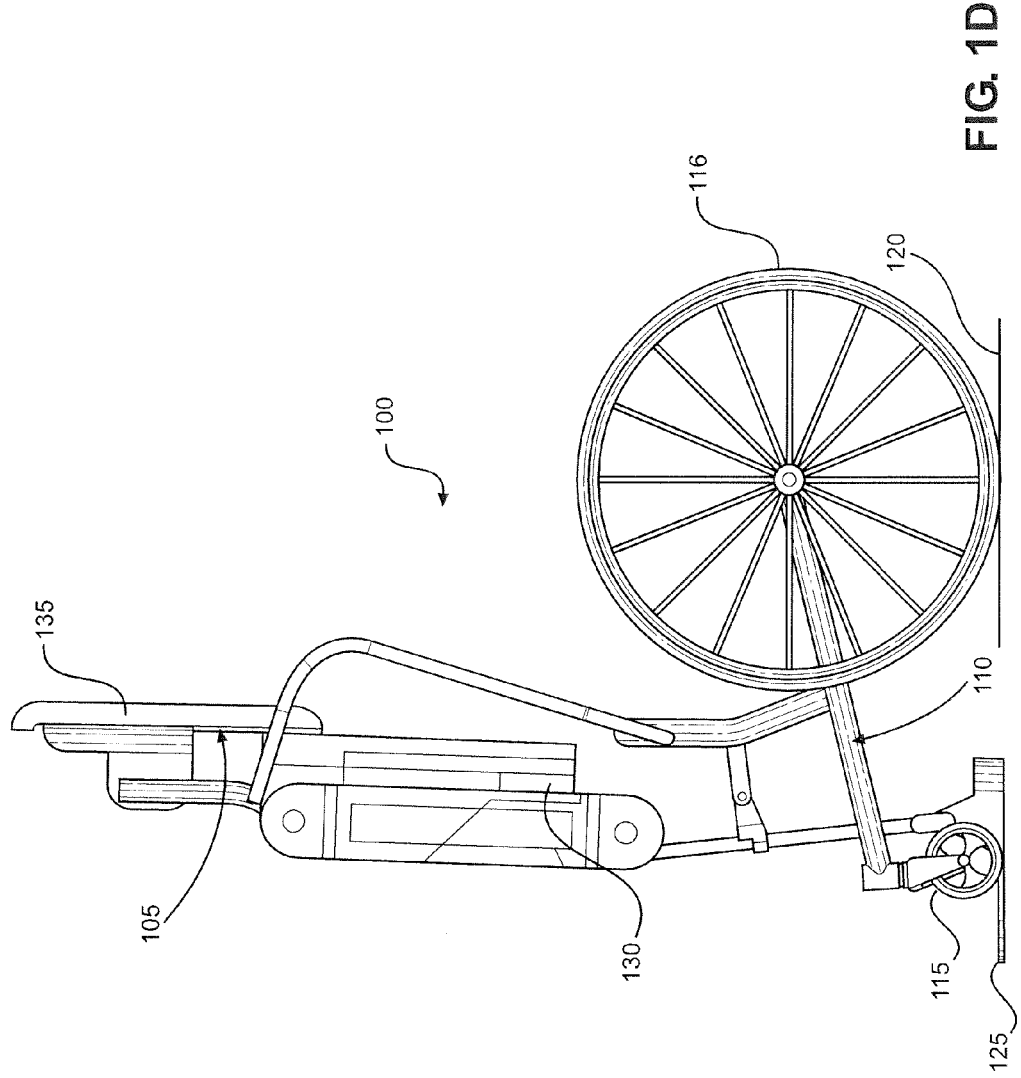

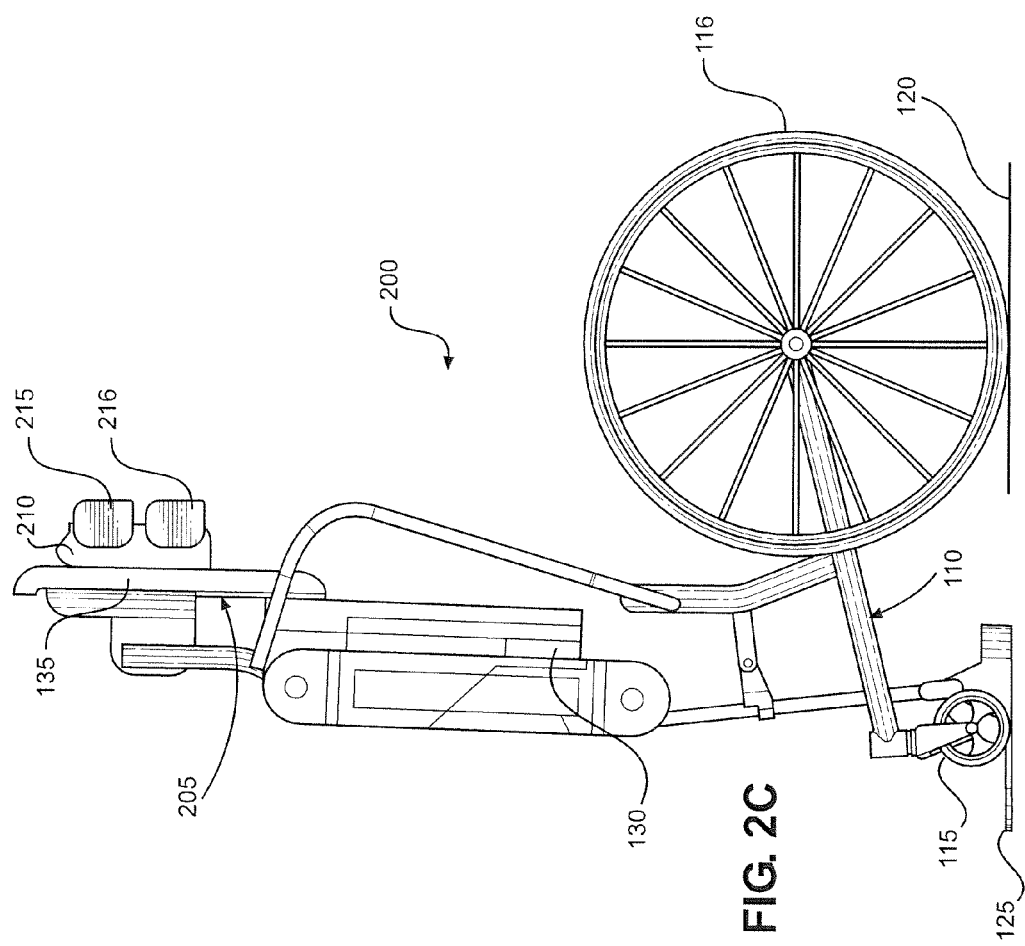

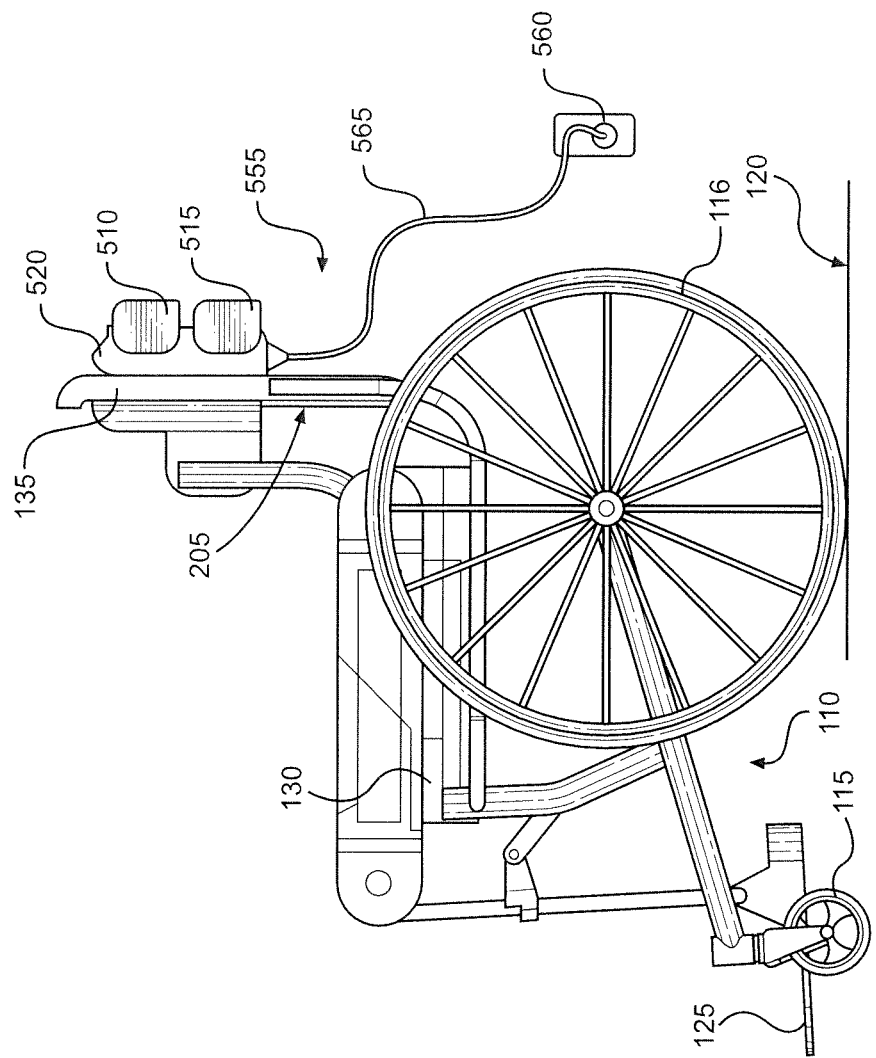

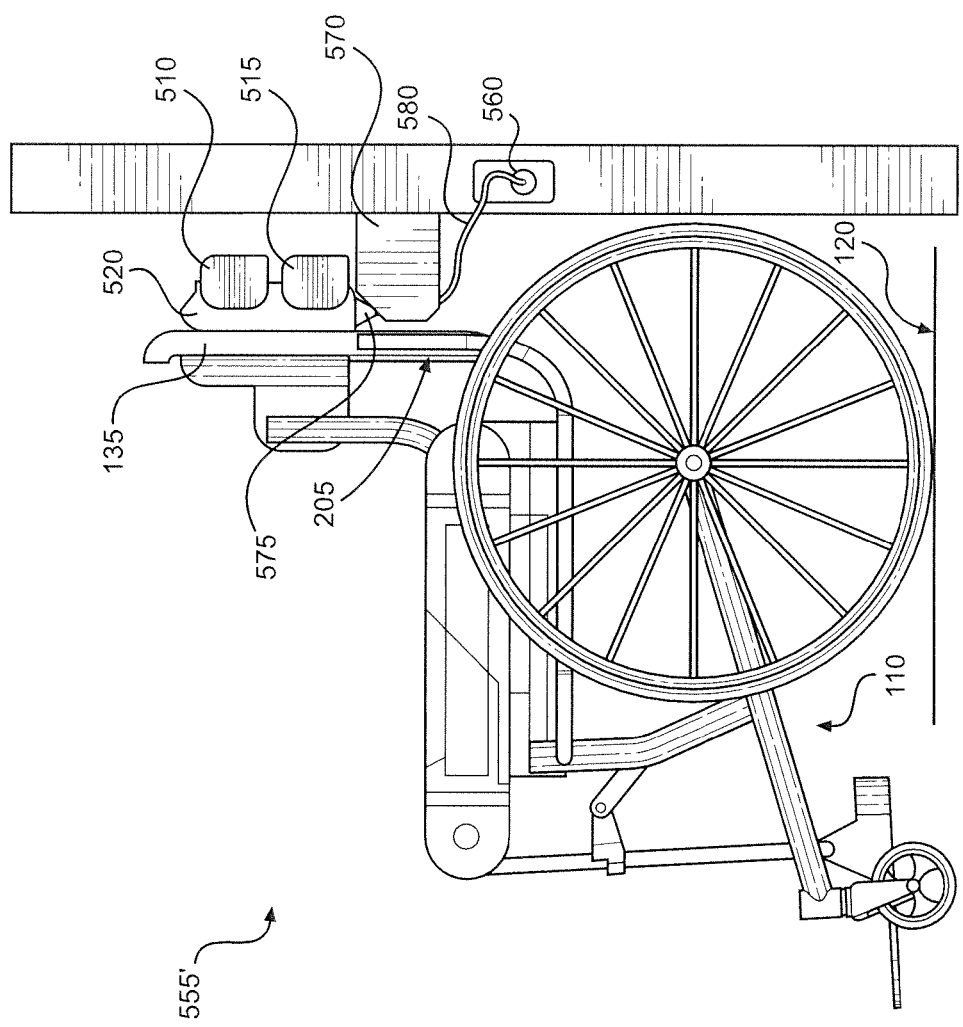

DEVICES AND METHODS FOR IMPROVING THE UTILITY OF AN EXOSKELETON MOBILITY BASE

CROSS REFERENCE TO RELATED APPLICATIONS

This application claims the benefit of U.S. Provisional Application No. 62/217,085, which was filed on Sep. 11, 2015 and titled "Devices and Methods for Improving the Utility of an Exoskeleton Mobility Base". The entire content of this application is incorporated herein by reference.

FIELD OF THE INVENTION

The present invention relates to devices that augment a user's strength and/or aid in the prevention of injury during the performance of certain motions or tasks. More particularly, the present invention relates to devices suitable for therapeutic use with patients that have impaired neuromuscular/muscular function of the appendages and devices suitable for use by a person engaging in heavy tool use or weight-bearing tasks. These devices comprise a set of artificial limbs, movable by actuators under the direction of control systems, that potentiate improved function of a user's appendages for activities including, but not limited to, enabling walking for a disabled person, granting greater strength and endurance in the user's arms, or allowing for more weight to be carried by the user while walking.

BACKGROUND OF THE INVENTION

Wearable exoskeletons have been designed for medical, commercial, and military applications. Medical exoskeletons are often used to restore and rehabilitate proper muscle function for people with disorders that affect muscle control. Medical exoskeletons include a system of motorized braces that can apply forces to a user's appendages. In a rehabilitation setting, medical exoskeletons are controlled by a physical therapist who uses one of a plurality of possible input means to command an exoskeleton control system. In turn, the exoskeleton control system actuates the position of the motorized braces, resulting in the application of force to, and typically movement of, the body of the user. Medical exoskeletons can also be used outside of a therapeutic setting to grant improved mobility to a disabled individual. Commercial and military exoskeletons are used to alleviate loads supported by workers or soldiers during their labor or other activities, thereby preventing injuries and increasing the user's stamina and strength. Tool-holding exoskeletons are outfitted with a tool-holding arm that supports the weight of a tool, reducing user fatigue by providing tool-holding assistance. The tool-holding arm transfers the vertical force required to hold the tool through the arms of the exoskeleton rather than through the user's arms and body. Similarly, weight-bearing exoskeletons transfer the weight of an exoskeleton load through the legs of the exoskeleton rather than through the user's legs. In some cases, weight-bearing exoskeletons are designed to carry a specific load, such as a heavy backpack. In other cases, military weight-bearing exoskeletons support the weight of armor. Commercial and military exoskeletons can have actuated joints that augment the strength of the exoskeleton user, with these actuated joints being controlled by the exoskeleton control system, and with the exoskeleton user using any of a plurality of possible input means to command an exoskeleton control system.

In powered exoskeletons, exoskeleton control systems prescribe and control trajectories in the joints of the exoskeleton, resulting in the movement of the exoskeleton. These control trajectories can be prescribed as position-based, force-based, or a combination of both methodologies, such as those seen in impedance controllers. Position-based control systems can be modified directly through modification of the prescribed positions. Force-based control systems can also be modified directly through modification of the prescribed force profiles. Complicated exoskeleton movements, such as walking in an ambulatory medical exoskeleton, are commanded by an exoskeleton control system through the use of a series of exoskeleton trajectories, with increasingly complicated exoskeleton movements requiring an increasingly complicated series of exoskeleton trajectories. These series of trajectories can be cyclic, such as the exoskeleton taking a series of steps with each leg, or they can be discrete, such as an exoskeleton rising from a seated position into a standing position. In the case of an ambulatory exoskeleton, during a rehabilitation session and/or over the course of rehabilitation, it is highly beneficial for the physical therapist to have the ability to modify the prescribed positions and/or the prescribed force profiles depending on the particular physiology or rehabilitation stage of a patient. As different exoskeleton users may be differently proportioned, variously adjusted or customized powered exoskeletons will fit each user somewhat differently, requiring that the exoskeleton control system take into account these differences in exoskeleton user proportion, exoskeleton configuration/customization, and exoskeleton user fit, resulting in changes to prescribed exoskeleton trajectories.

While exoskeleton control systems assign trajectories to the joints of the exoskeleton and control the positions of these joints, the actual forces applied to exoskeleton joints are exerted by actuators. These actuators can take many forms, as is known in the art, each with advantages and disadvantages in various applications. In current exoskeletons, the actuator exerting force on a joint typically comprises an electric motor located proximal to the joint that is being controlled. Exoskeletons also are equipped with a variety of sensors, as is known in the art, with these sensors reporting information on exoskeleton state to the exoskeleton control system.

Ambulatory exoskeleton-based physical therapy is currently in use with patients that have been affected by a variety of conditions, including stroke and spinal cord injuries. Such patients may have reduced or no ability to control certain muscles, including muscles involved in walking. These same patients, in many cases, also use wheelchairs for purposes of mobility. Wheelchairs, including both powered and manual wheelchairs, are a very efficient form of transportation in certain environments—though many natural and man-made environments are inaccessible to wheelchairs. Dynamic wheeled mobility is exemplified in the marketplace by specialized standing and/or tilt/recline wheelchairs (both manual and powered), as well as the recently developed and commercialized "Elevation" wheelchair. In addition, the device described in International Application No. PCT/CA2013/050836, which is incorporated herein by reference, allows an exoskeleton and user to sit in a specific wheeled base, with this wheeled base being compatible with the exoskeleton frame. The wheeled base includes mechanisms to assist the exoskeleton and user in standing while doffing the wheeled base or in sitting while donning the wheeled base. The wheeled base aims to overcome disadvantages seen in some current exoskeletons, such as slow exoskeleton gait and limited exoskeleton range, as well as relatively complex exoskeleton operation compared to that of a wheelchair, by allowing the exoskeleton user to use the wheeled base like a wheelchair in situations or environments where the use of a wheelchair would be preferred to an exoskeleton.

One disadvantage of combining an exoskeleton with an unpowered wheelchair is the extra weight the user has to maneuver during rolling actions and while entering and exiting automobiles. Minimizing loading on the user's shoulders and other body parts is important in preventing repetitive stress injuries and fatigue. The ability of the wheeled base to provide rolling assistance is not novel as there are many powered wheelchairs already invented, but powered wheel propulsion is one way to overcome the burden upon a patient of maneuvering the extra weight of the exoskeleton when combined with a wheeled base. A major benefit of integrating a wheeled base and exoskeleton is the energy efficiency of rolling transport compared to walking. An exoskeleton will weigh a minimum of 20 pounds, and could be as heavy as 70 pounds, so supporting the exoskeleton weight on a wheeled base will make moving it from one location to another easier than other methods, such as taking the exoskeleton apart and putting it into a bag or case. Another benefit of transporting an exoskeleton on a wheeled base is that the weight can be balanced ideally between the front and rear wheels since it is aligned with the user's body (this is how wheelchairs are configured for stability). Transporting an exoskeleton in a bag or case could require it to be carried in the user's lap or supported on the front or back of the wheelchair, thus requiring additional wheels or counterweight to prevent tip-over. Another less ideal transport method would be to have a helper carry or roll a bag or case with the exoskeleton components disassembled or folded. By integrating the exoskeleton and wheelchair, user independence, safety, access, convenience, and energy efficiency are maximized.

A person who uses an exoskeleton and a wheeled base for mobility, or who uses another type of exoskeleton-wheelchair hybrid device, will have significant power consumption requirements to enable exoskeleton standing from a sitting position and exoskeleton walking with bipedal gait. Exoskeletons receive power from energy modules ("EMODs"), with these EMODs being electrical batteries of any type or chemistry, fuel cells, compressed air, or any of a plurality of other energy storage means known in the art. The EMODs used to provide power to exoskeletons have a limited capacity that may be less than the power requirements of a desired exoskeleton use. When more capacity is desired in a single EMOD, the resulting module will typically weigh more. Since the ideal exoskeleton will have no tethers, this EMOD weight will be mounted on the exoskeleton and will therefore be supported and moved by the system. However, mounting heavier EMODs to an exoskeleton will increase power usage. One conventional way to deal with this trade-off is to choose an energy storage method that is as efficient as possible. Another conventional method is to design the exoskeleton power consumption to be as efficient as possible. These are both difficult challenges that are not likely to meet user usage expectations in the near term. In addition, airline and shipping regulations limit the energy capacity in some types of EMODs for safety reasons, providing further restrictions on the portable power supplies that can be used by travelers.

In view of the above, there exists an unmet need in the art to increase the range and operating time of an exoskeleton by increasing the total power available to the exoskeleton.

There exists a further unmet need to make this additional power mobile and available to the exoskeleton in locations distal to stationary sources of energy, such as wall outlets. In addition, there exists an unmet need to provide for shared power systems between an exoskeleton and a wheeled base.

SUMMARY OF THE INVENTION

The present invention is directed to a mobility system and a method of extending a range of an exoskeleton. The mobility system comprises an energy module, an exoskeleton and a mobile base. The exoskeleton includes an exoskeleton energy module receptacle that is configured to receive the energy module, and the mobile base includes a mobile base energy module receptacle that is also configured to receive the energy module. In addition, the mobile base includes an exoskeleton support configured to support the exoskeleton on the mobile base, the mobile base being configured to transport the exoskeleton across a support surface.

In one embodiment, at least one of the exoskeleton and mobile base energy module receptacles includes an automated energy module transfer mechanism configured to automatically transfer the energy module between the exoskeleton and mobile base energy module receptacles. In another embodiment, the exoskeleton energy module receptacle is configured to automatically and selectively couple the energy module thereto, and the mobile base energy module receptacle is configured to automatically and selectively couple the energy module thereto. The exoskeleton further includes an exoskeleton control system configured to control coupling of the energy module to the exoskeleton energy module receptacle, and the mobile base further includes a mobile base control system configured to control coupling of the energy module to the mobile base energy module receptacle. The exoskeleton and mobile base control systems are configured to coordinate whether the energy module is coupled to the exoskeleton energy module receptacle or the mobile base energy module receptacle. The exoskeleton is configured to determine a remaining power of the energy module when the energy module is received in the exoskeleton energy module receptacle, and the mobile base is further configured to determine the remaining power of the energy module when the energy module is received in the mobile base energy module receptacle. The exoskeleton and mobile base control systems are configured to coordinate whether the energy module is coupled to the exoskeleton energy module receptacle or the mobile base energy module receptacle based on the remaining power of the energy module.

In one embodiment, the exoskeleton further includes an exoskeleton power system and actuators configured to cause movement of the exoskeleton. The exoskeleton energy module receptacle is configured to transfer power from the energy module to the exoskeleton power system when the energy module is received in the exoskeleton energy module receptacle. The exoskeleton power system is configured to transfer power to the actuators. In addition, the mobile base further includes a mobile base power system and propulsive motors configured to cause movement of the mobile base across the support surface. The mobile base energy module receptacle is configured to transfer power from the energy module to the mobile base power system when the energy module is received in the mobile base energy module receptacle. The mobile base power system is configured to transfer power to the propulsive motors. The mobile base is further configured to receive power from an external energy supply, and the mobile base energy module receptacle is further configured to transfer power to the energy module when the energy module is received in the mobile base energy module receptacle, thereby charging the energy module. The exoskeleton is configured to receive power from the mobile base, and the exoskeleton energy module receptacle is further configured to transfer power to the energy module when the energy module is received in the exoskeleton energy module receptacle, thereby charging the energy module. The exoskeleton is further configured to transfer power to the mobile base.

In one embodiment, the mobile base further includes a docking interface configured to connect to a docking port. The docking port is configured to receive power from the external energy supply and transfer the energy to the mobile base through the docking interface when the docking interface is connected to the docking port. In another embodiment, the external energy supply is an electric generator mounted on the mobile base.

In one embodiment, the mobility system further comprises a central server, and the mobile base further includes a mobile base control system configured to receive data from the central server and cause movement of the mobile base based on the data. In another embodiment, the exoskeleton further includes an exoskeleton control system, and the mobile base further includes a mobile base control system configured to receive data from the exoskeleton control system and cause movement of the mobile base based on the data. The exoskeleton further includes a user interface configured to receive commands from a user and pass the commands to the mobile base control system through the exoskeleton control system. The mobile base control system is configured to cause movement of the mobile base based on the commands.

In one embodiment, the mobility system further comprises a wheelchair accessible vehicle including a wheelchair accessible vehicle power system and a docking port configured to connect the mobile base to the wheelchair accessible vehicle. The mobile base further includes a mobile base power system, and the docking port is configured to transfer power from the wheelchair accessible vehicle power system to the mobile base power system. The mobile base energy module receptacle is further configured to transfer power from the mobile base power system to the energy module when the energy module is received in the mobile base energy module receptacle, thereby charging the energy module.

In one embodiment, the energy module is a battery, and the exoskeleton is an ambulatory exoskeleton. The ambulatory exoskeleton includes a foot support, a lower leg support, an upper leg support, a back support, a leg brace, a torso brace, a knee actuator and a hip actuator. The back support includes the exoskeleton energy module receptacle.

In one embodiment, the mobile base further includes a wheel configured to contact the support surface, and rotation of the wheel causes movement of the mobile base across the support surface. In another embodiment, the mobile base further includes a track configured to contact the support surface, and movement of the track causes movement of the mobile base across the support surface. The mobile base is configured to transport the exoskeleton across the support surface while the exoskeleton is in a standing position.

In one embodiment, the exoskeleton energy module receptacle is configured to receive a plurality of energy modules, and the mobile base energy module receptacle is configured to receive a plurality of energy modules. A first energy module is uncoupled from the mobile base energy module receptacle and coupled to the exoskeleton energy module receptacle. A second energy module is uncoupled from the exoskeleton energy module receptacle and coupled to the mobile base energy module receptacle. Power is transferred to the energy modules while the energy modules are coupled to the mobile base energy module receptacle, and power is transferred from the energy modules to the exoskeleton while the energy modules are coupled to the exoskeleton energy module receptacle.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE FIGURES

FIG. 1D is a side view of the wheeled base of FIG. 1A, with the chair portion of the wheeled base shown in an upright position;

FIG. 2C is a side view of the wheeled base of FIG. 2A, with the chair portion of the wheeled base shown in an upright position;

FIG. 5E is a side view of the mobile base drawing power from an external source in accordance with the fourth embodiment, with the mobile base being mounted with additional exoskeleton-compatible and detachable EMODs, and the mobile base being connected to the external power source by a flexible power conduit, thereby allowing for recharging of the EMODs;

FIG. 5F is a side view of the mobile base drawing power from an external source in accordance with the fourth embodiment, with the mobile base being mounted with additional exoskeleton-compatible and detachable EMODs, and the mobile base being connected to the external power source by a docking port that attaches to the EMOD receptacle on the mobile base, thereby allowing for recharging of the EMODs;

DESCRIPTION OF THE INVENTION

Figure 1A:
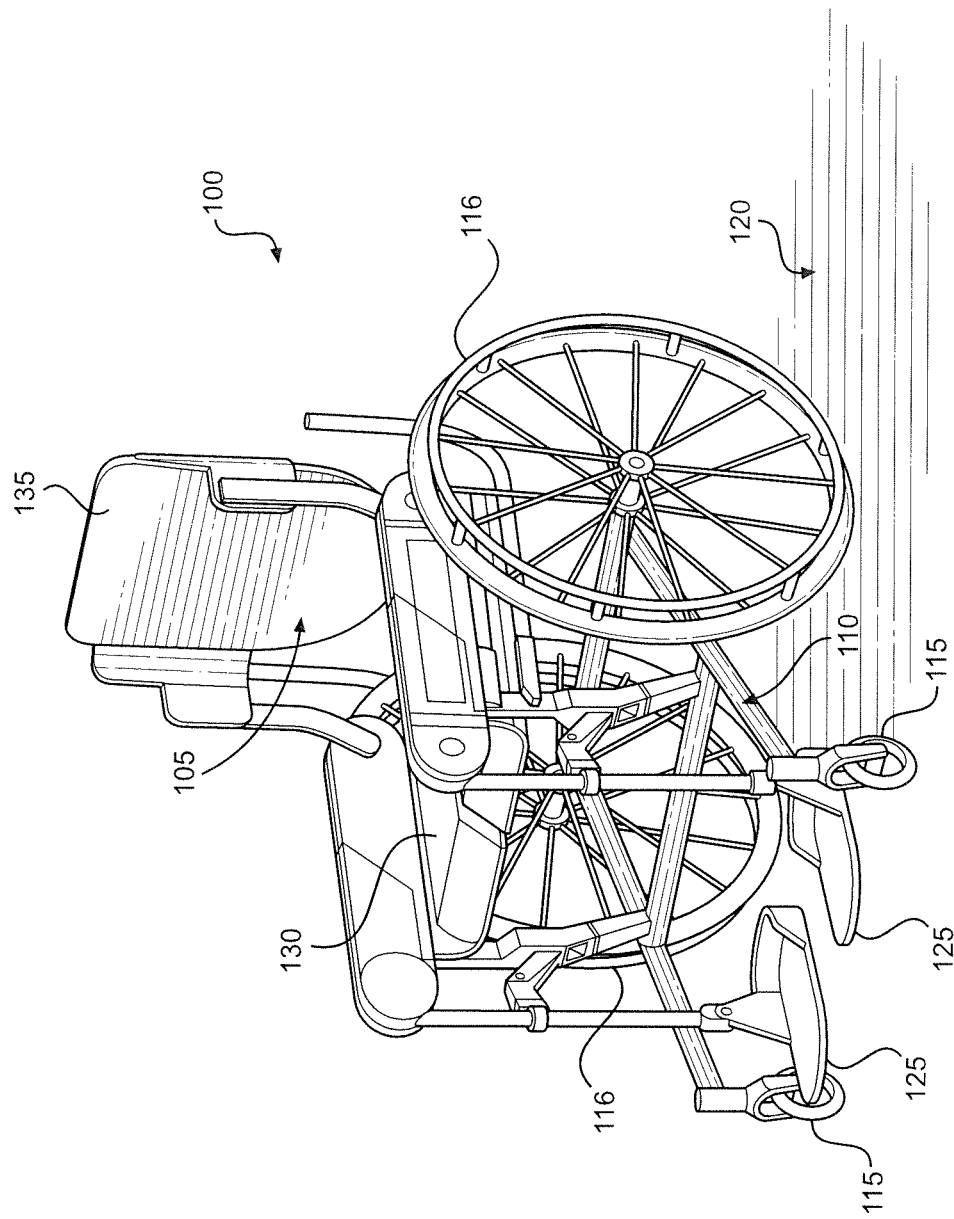
FIG. 1A is a perspective view of a wheeled base that can be selectively coupled to an ambulatory exoskeleton, as described in International Application No. PCT/CA2013/050836, with the chair portion of the wheeled base shown in a seated position.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

It is a primary object of the present invention to provide devices and methods that allow for a motorized mobile exoskeleton base to fully or partially provide propulsive assistance to the mobile base utilizing the energy stored in exoskeleton-compatible EMODs being transported by the mobile base. It is an additional object of the present invention to provide devices and methods that allow for the transportation of portable exoskeleton energy storage devices upon the mobile base.

It is a further object of the present invention to provide devices and methods that allow the mobile base to recharge one or more portable exoskeleton energy storage devices by interfacing with an external energy source. In addition, it is an object of the present invention to provide devices and methods that allow for power sharing between the systems of the exoskeleton, the mobile base, and the external energy source to provide operating or charging power to the exoskeleton, the mobile base, or portable exoskeleton energy storage devices attached to either the exoskeleton or the mobile base. It is also an object of the present invention to provide devices and methods that allow for an automated mechanism to transfer one or more portable exoskeleton energy storage devices between the exoskeleton and the mobile base when the exoskeleton is affixed to the mobile base.

It is an additional object of the present invention to provide devices and methods that enable the control of the mobile base's movement direction, velocity, acceleration, locking, and unlocking in a static position, or any other operation of the mobile base that the exoskeleton user, or other party in command of the mobile base, may desire. It is a further object of the present invention to provide devices and methods that enable integration of the combined mobile base and exoskeleton mobility system with WAVs. It is also an object of the present invention to provide devices and methods that improve the traction, balance and mobility of the exoskeleton and mobile base over uneven, sloped, slippery surfaces, stairs, burbs, and other obstructions.

Concepts were developed to allow for the transportation of portable exoskeleton energy storage devices, in the form of one or more EMODs, upon a mobile exoskeleton base, such as the wheelchair-like exoskeleton base described in International Application No. PCT/CA2013/050836. The EMODs are manually detachable from the mobile base and attachable to an exoskeleton, with EMODs attached to the exoskeleton providing power to the exoskeleton systems. Concepts were further developed to allow the utilization of energy stored in the EMODs being carried by the mobile base, with the base having motorized propulsion to fully or partially provide assistance in turning the wheels of the mobile base.

Concepts were also developed to allow the mobile base to recharge one or more EMODs by interfacing with an external energy source. In addition, concepts were developed to allow for power sharing between the systems of the exoskeleton, the mobile base, and the external energy source to provide operating or charging power to the exoskeleton, the mobile base, or EMODs attached to either the exoskeleton or the mobile base. Concepts were further developed to allow for an automated mechanism to transfer one or more EMODs between the exoskeleton and the mobile base when the exoskeleton is affixed to the mobile base.

Concepts were developed to allow for the control of the mobile base's movement direction, velocity, acceleration, locking, and unlocking in a static position, or any other operation of the mobile base that the exoskeleton user, or other party in command of the mobile exoskeleton base, may desire. Concepts were also developed to allow for the integration of the combined mobile base and exoskeleton mobility system with WAVs. Concepts were further developed for devices that improve the traction, balance and mobility of the exoskeleton and mobile base over uneven, sloped, slippery surfaces, stairs, burbs, and other obstructions. In addition, concepts were developed for an exoskeleton mobility system in which the exoskeleton and user stand upright upon the mobility system.

Figure 1B:
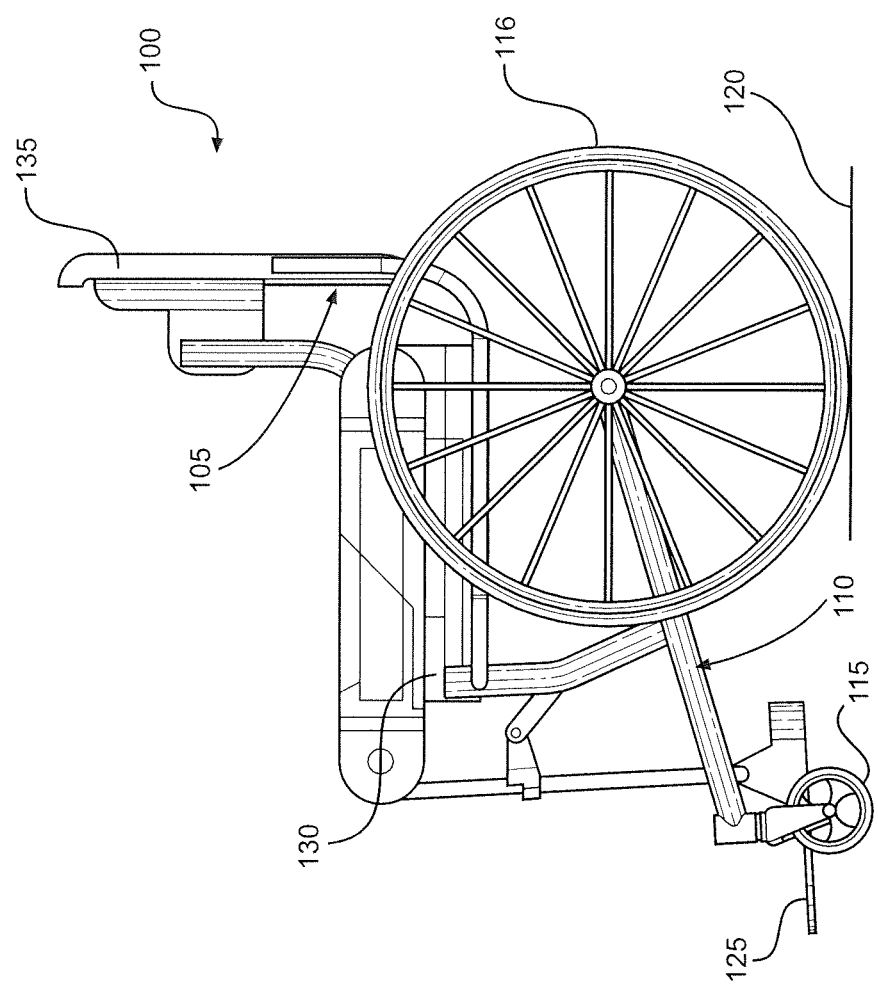
FIG. 1B is a side view of the wheeled base of FIG. 1A.
Figure 1C:
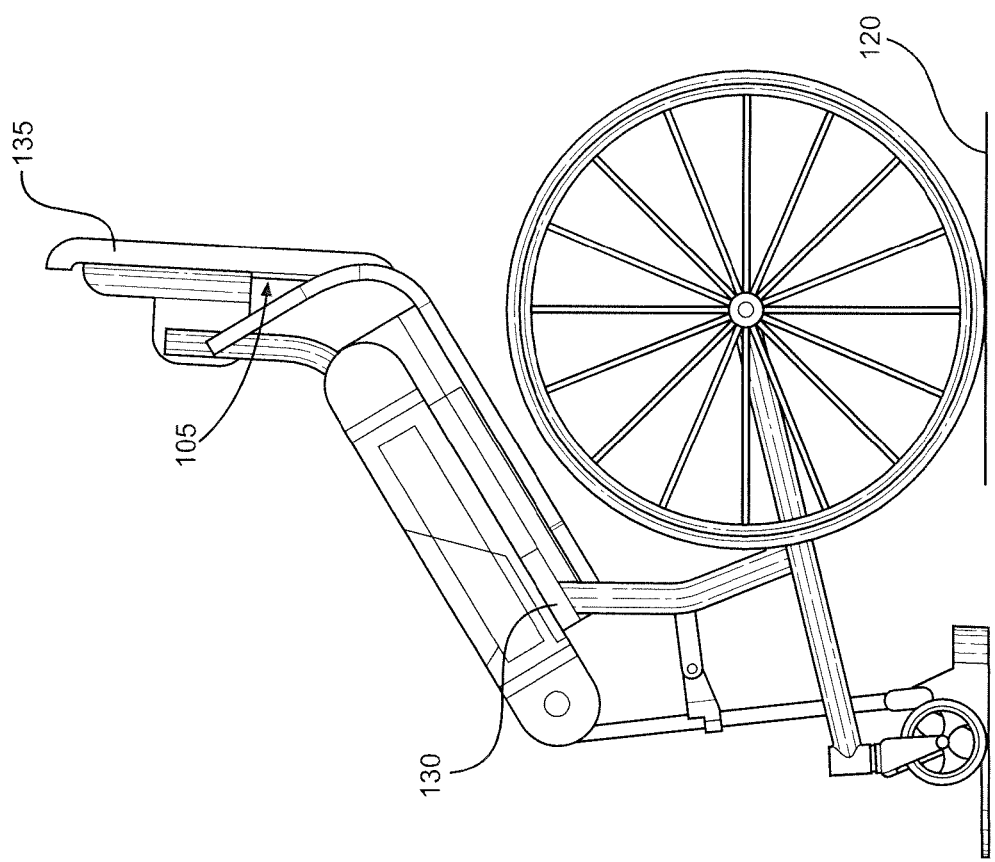
FIG. 1C is a side view of the wheeled base of FIG. 1A, with the chair portion of the wheeled base shown in an intermediate position.

With initial reference to FIGS. 1A-D, the wheelchair-like wheeled exoskeleton base described in International Application No. PCT/CA2013/050836 is shown. In particular, a wheeled base 100 includes an exoskeleton support 105 and a wheeled base frame 110. Wheeled base frame 110 is connected to exoskeleton support 105 and includes front wheels 115 and rear wheels 116, which allow wheeled base 100 to roll over a support surface 120. Exoskeleton support 105 includes foot supports 125, an upper leg and hip support 130, and a seat back 135. Each component of exoskeleton support 105 is rotatably connected to the other components of exoskeleton support 105 and to wheeled base frame 110 in such a way as to allow exoskeleton support 105, as well as an exoskeleton and user coupled to exoskeleton support 105, to transition from a seated configuration to an upright configuration. The seated configuration is illustrated in FIGS. 1A and 1B, while the upright configuration is illustrated in FIG. 1D. An intermediate position is shown in FIG. 1C. In some embodiments, rear wheels 116 are motorized for purposes of propulsion. In some embodiments, motorized mechanisms assist in the transition of exoskeleton support 105 between seated and upright positions. As the structural particulars of a wheeled base can take various forms, as is known in the art, and are not part of the present invention, they will not be detailed further herein.

Figure 2A:
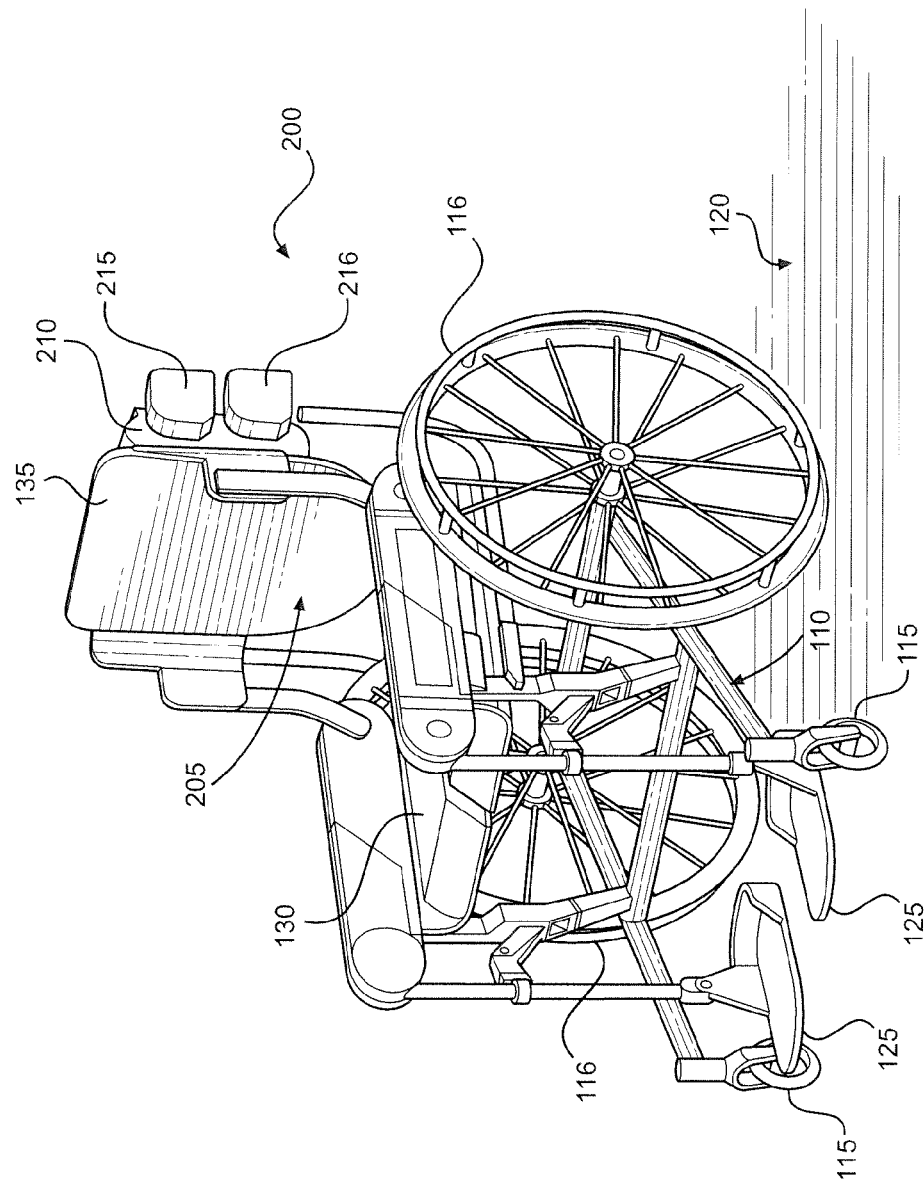
FIG. 2A is a perspective view of a wheeled base, mounted with additional exoskeleton-compatible and detachable EMODs, constructed in accordance with a first embodiment of the present invention, with the chair portion of the wheeled base shown in a seated position.
Figure 2B:
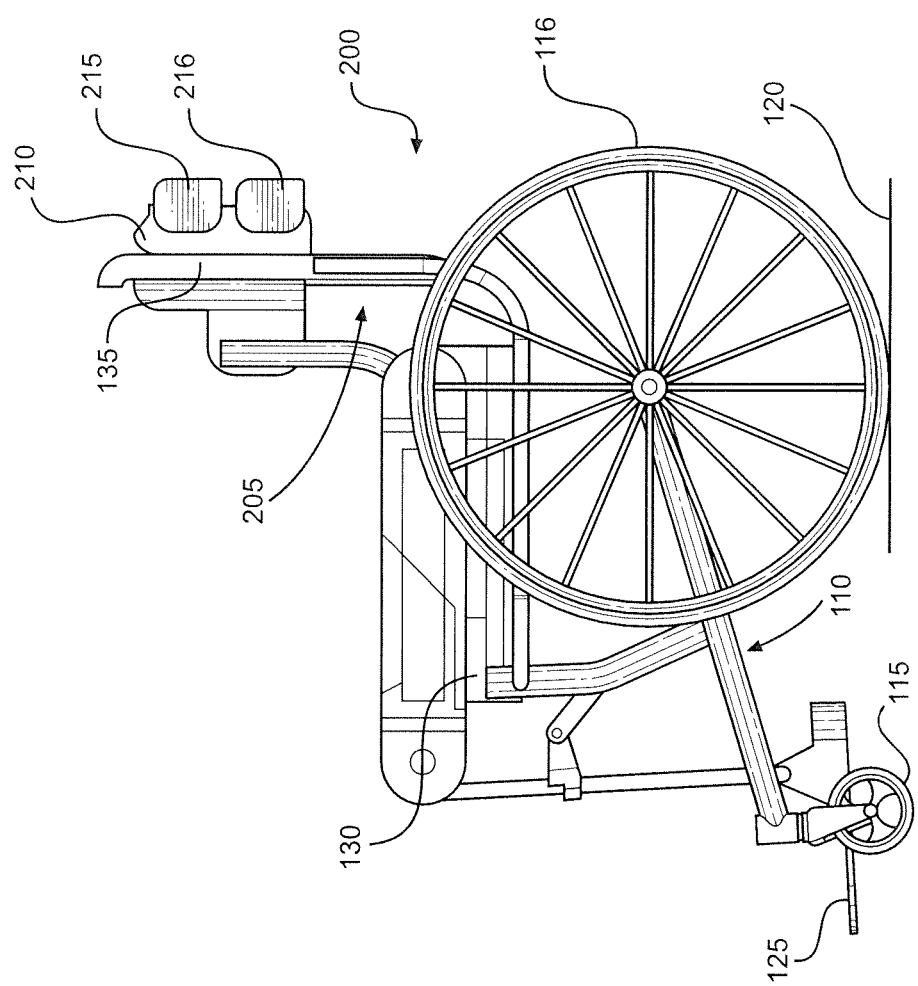
FIG. 2B is a side view of the wheeled base of FIG. 2A.

With reference now to FIGS. 2A-F, a first embodiment of the present invention is shown. Specifically, FIGS. 2A-C show a wheeled (or mobile) base 200 constructed in accordance with the first embodiment. Wheeled base 200 includes an exoskeleton support 205 and wheeled base frame 110. Wheeled base frame 110 is connected to exoskeleton support 205 and includes front wheels 115 and rear wheels 116, which allow wheeled base 200 to roll over surface 120. Accordingly, rotation of wheels 115 and 116 causes movement of wheeled base 200 across surface 120 such that wheeled base 200 can transport an exoskeleton across surface 120. Exoskeleton support 205 is configured to support an exoskeleton on wheeled base 200 and includes foot supports 125, upper leg and hip support 130, and seat back 135. Each component of exoskeleton support 205 is rotatably connected to the other components of exoskeleton support 205 and to wheeled base frame 110 in such a way as to allow exoskeleton support 205, as well as an exoskeleton and user coupled to exoskeleton support 205, to transition from a seated configuration to an upright configuration. The seated configuration is illustrated in FIGS. 2A and 2B, while the upright configuration is illustrated in FIG. 2C. Wheeled base 200 also includes an EMOD receptacle 210 that receives and supports the weight of a first EMOD 215 and a second EMOD 216, which are directly coupled thereto. EMOD receptacle 210 is connected to seat back 135 such that the weight of EMODs 215 and 216 is transferred through exoskeleton support 205 to wheeled base frame 110 and then to surface 120. In some embodiments, the wheeled base is only usable in the seated configuration, i.e., the wheeled based cannot transition between seated and upright configurations.

Figure 2D:
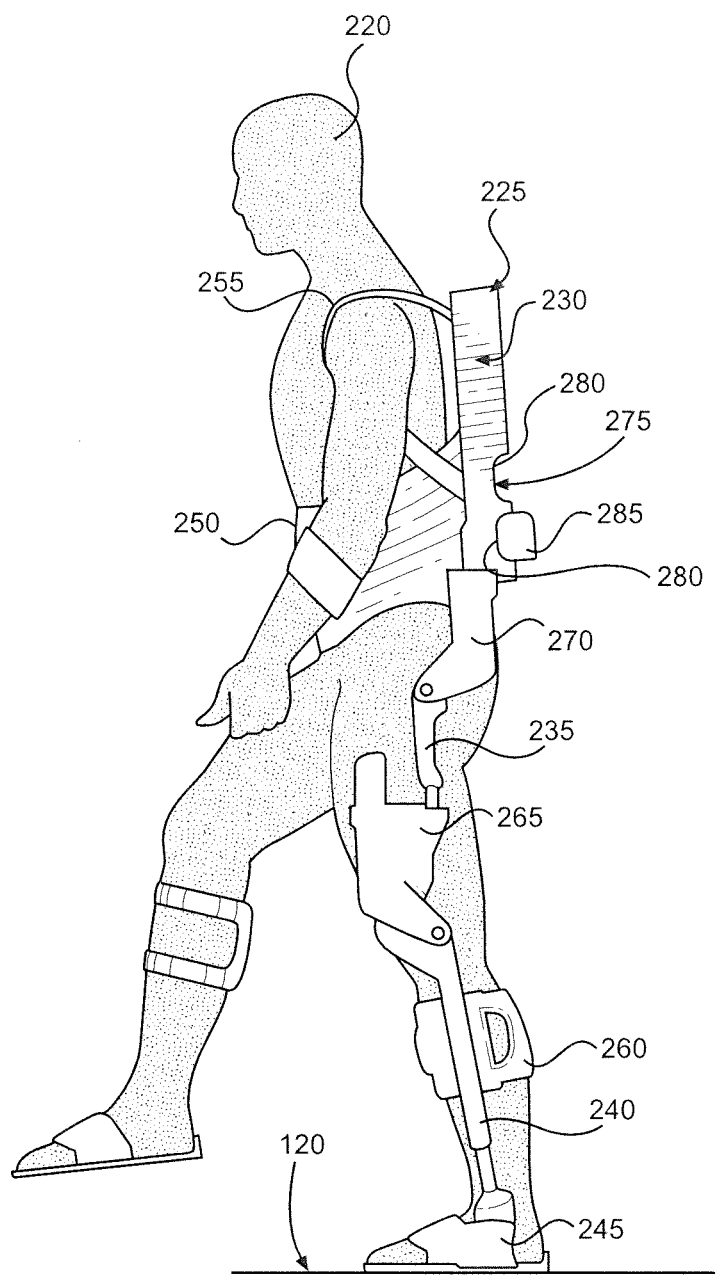
FIG. 2D is a side view of a person wearing an ambulatory exoskeleton constructed in accordance with the first embodiment, the exoskeleton being configured to use detachable EMODs of the type mounted on the wheeled base of FIG. 2A as a primary or supplemental source of exoskeleton power, with the exoskeleton shown with a single EMOD affixed to the exoskeleton structure.
Figure 2E:
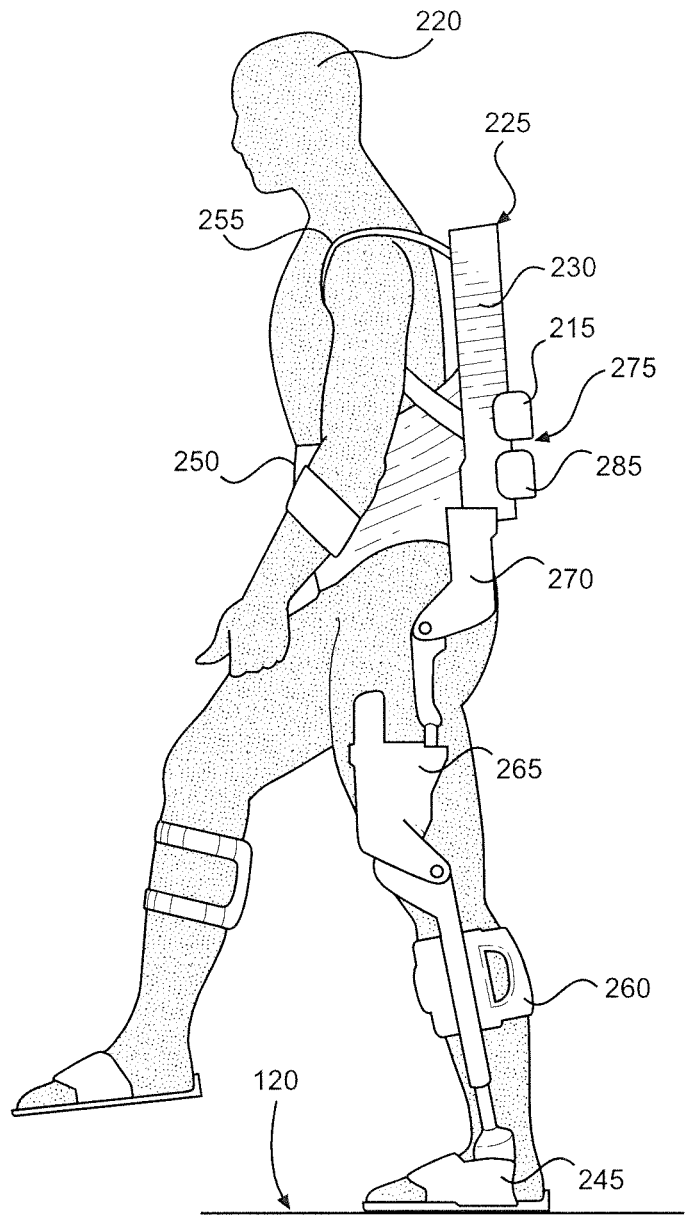
FIG. 2E is a side view of the exoskeleton of FIG. 2D, with the exoskeleton shown with two EMODs affixed to the exoskeleton structure.
Figure 2F:
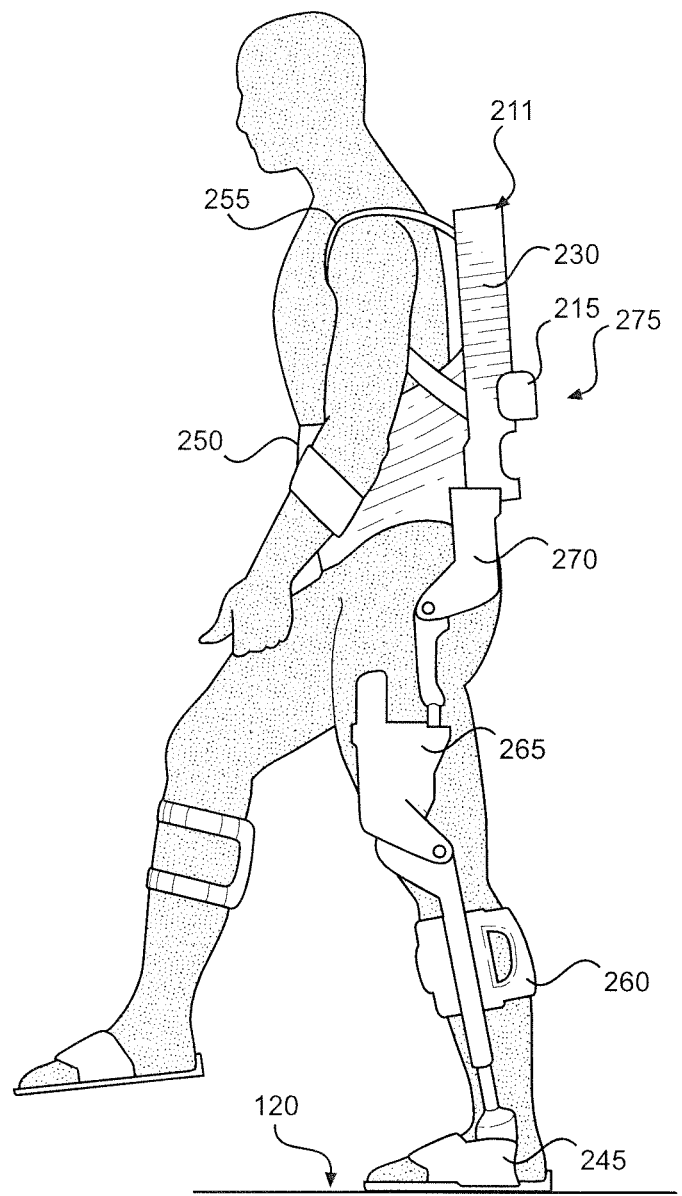
FIG. 2F is a side view of the exoskeleton of FIG. 2D, with the exoskeleton shown with a single EMOD affixed to the exoskeleton structure, the EMOD being in an alternative position relative to that shown in FIG. 2D.

Turning to FIGS. 2D-F, a person (or user) 220 is shown wearing an exoskeleton 225 constructed in accordance with the first embodiment. Exoskeleton 225 includes a back support 230, an upper leg support 235, a lower leg support 240, and foot support 245. Exoskeleton 225 is coupled to person 220 by a torso brace 250, shoulder strapping 255, and a leg brace 260. A knee actuator 265 and a hip actuator 270 cause movement of a leg of person 220 via movement of upper leg support 235 and lower leg support 240. As the structural particulars of exoskeleton 225 can take various forms, as is known in the art, and are not part of the present invention, they will not be detailed further herein. Exoskeleton 225 is configured to be carried by and/or affixed to wheeled base 200 through exoskeleton support 205, as described in International Application No. PCT/CA2013/050836. In addition, exoskeleton 225 is configured to use EMODs, such as those carried by wheeled base 200, as a power source for the systems of exoskeleton 225. The EMODs can be directly coupled to an EMOD receptacle 275 of exoskeleton 225. As illustrated, EMOD receptacle 275 is part of back support 230. However, EMOD receptacle 275 can be located elsewhere on exoskeleton 225. EMOD receptacle 275 has two slots 280 to which the EMODs can be affixed (i.e., in which the EMODs can be received). In FIG. 2D, an EMOD 285 powers exoskeleton 225. As the power in EMOD 285 is depleted, person 220 can remove first EMOD 215 from wheeled base 200 and couple first EMOD 215 to EMOD receptacle 275 of exoskeleton 225, as shown in FIG. 2E, thereby allowing exoskeleton 225 to draw additional power from first EMOD 215. In order to reduce the weight of exoskeleton 225, person 220 can then remove the depleted EMOD (i.e., EMOD 285) from exoskeleton 225, as shown in FIG. 2F.

In some embodiments, the ability of exoskeleton 225 to draw power from more than one EMOD at a time is advantageous in that exoskeleton 225 will not lose power during an exchange of EMODs (e.g., during the transition shown in FIGS. 2D-F). As a result, a depleted EMOD can be removed and a full one inserted without requiring person 220 to sit down or fully turn off exoskeleton 225. In other embodiments, the desire for a reduced weight exoskeleton results in only a single EMOD being mountable on the exoskeleton, in which case an EMOD swap would result in the exoskeleton losing power. In such an embodiment, wheeled base 200 provides a convenient and safe sitting location during EMOD exchange. In another embodiment, the exoskeleton has some auxiliary power so that exoskeleton systems can remain active for a limited period of time with no EMOD affixed, thereby allowing EMOD exchange without loss of power to exoskeleton actuators or other systems. In other embodiments, more than two EMODs are used to provide power to the exoskeleton, and more than two EMODs are carried on the wheeled base. In some embodiments, the EMODs are mounted at different positions on the exoskeleton or wheeled base to facilitate ease of exchange by person 220. Preferably, the exoskeleton system is configured such that a user with sufficient arm and hand function is able to remove an EMOD independently, either wearing the exoskeleton or not.

As an example of the first embodiment of the present invention, consider a disabled person using an exoskeleton as a mobility device. In some environments, the exoskeleton grants superior personal mobility characteristics, as compared to a wheelchair. However, in some cases, the power consumption requirements of the exoskeleton can result in either insufficient range of operating time or a very heavy (and slow/cumbersome) exoskeleton. This disabled person may also use wheelchair mobility devices, including the specialized exoskeleton-bearing wheeled base devices described above, as an alternative or supplement to exoskeleton-based mobility. If the person wanted to use the exoskeleton for a greater period of time than allowed by exoskeleton power consumption, for reasons such as improved mobility in certain environments or for community/social reasons, the person could make use of the device of the first embodiment in which a wheeled base supports the weight of additional power storage devices for the exoskeleton. This would allow the person to extend the operating time of the exoskeleton without the exoskeleton having to support the weight of this additional energy capacity (in this case, the weight of replacement EMODs). Transporting additional EMODs from one location to another on the wheeled base is more energy efficient than the available alternatives.

Figure 3A:
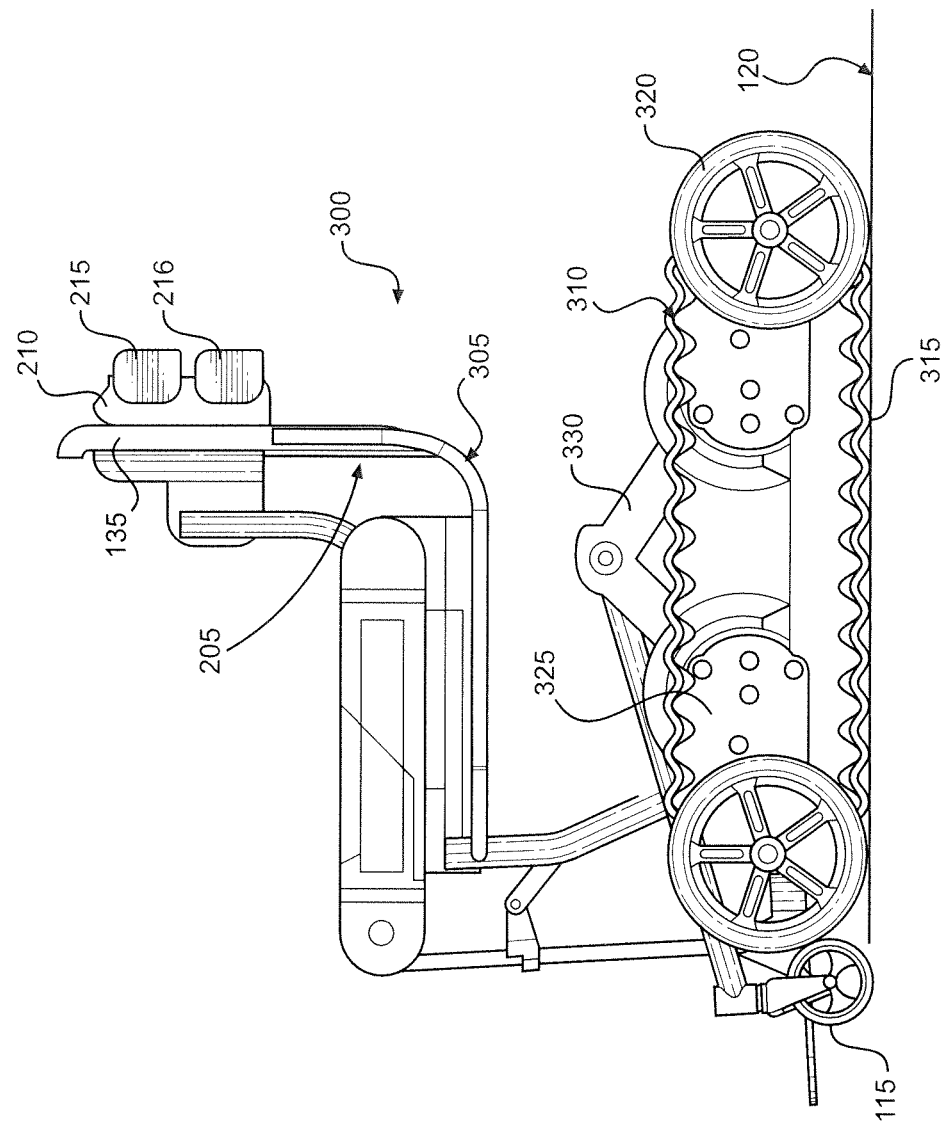
FIG. 3A is a side view of a tracked, wheelchair-like mobility device, mounted with additional exoskeleton-compatible and detachable EMODs, constructed in accordance with a second embodiment of the present invention, with the chair portion of the mobility device shown in a seated position.

With reference now to FIG. 3A, a second embodiment of the present invention is shown. In the second embodiment, rear wheels 116 of wheeled base 200 have been replaced with a track to provide a tracked base 300. Tracked base 300 includes exoskeleton support 205, a base frame 305 and a propulsion system 310. Propulsion system 310 includes a track 315, drive wheels 320, a drive mechanism 325, and a support structure 330. Base frame 305 is connected to propulsion system 310 at support structure 330 and to front wheels 115. Propulsion system 310 interacts with surface 120 through track 315, with front wheels 115 primarily acting as balance support when exoskeleton support 205 and base frame 305 are transitioning into an upright configuration. Movement of track 315 causes movement of tracked base 300 across surface 120. In some embodiments, front wheels 115 are absent and replaced by another support device that interacts with surface 120 during transitions between seated and upright configurations. In some embodiments, track 315 is articulated in such a way as to enable ascent or descent of a curb, uneven terrain, or a set of stairs, as is known in the art.

Figure 3B:
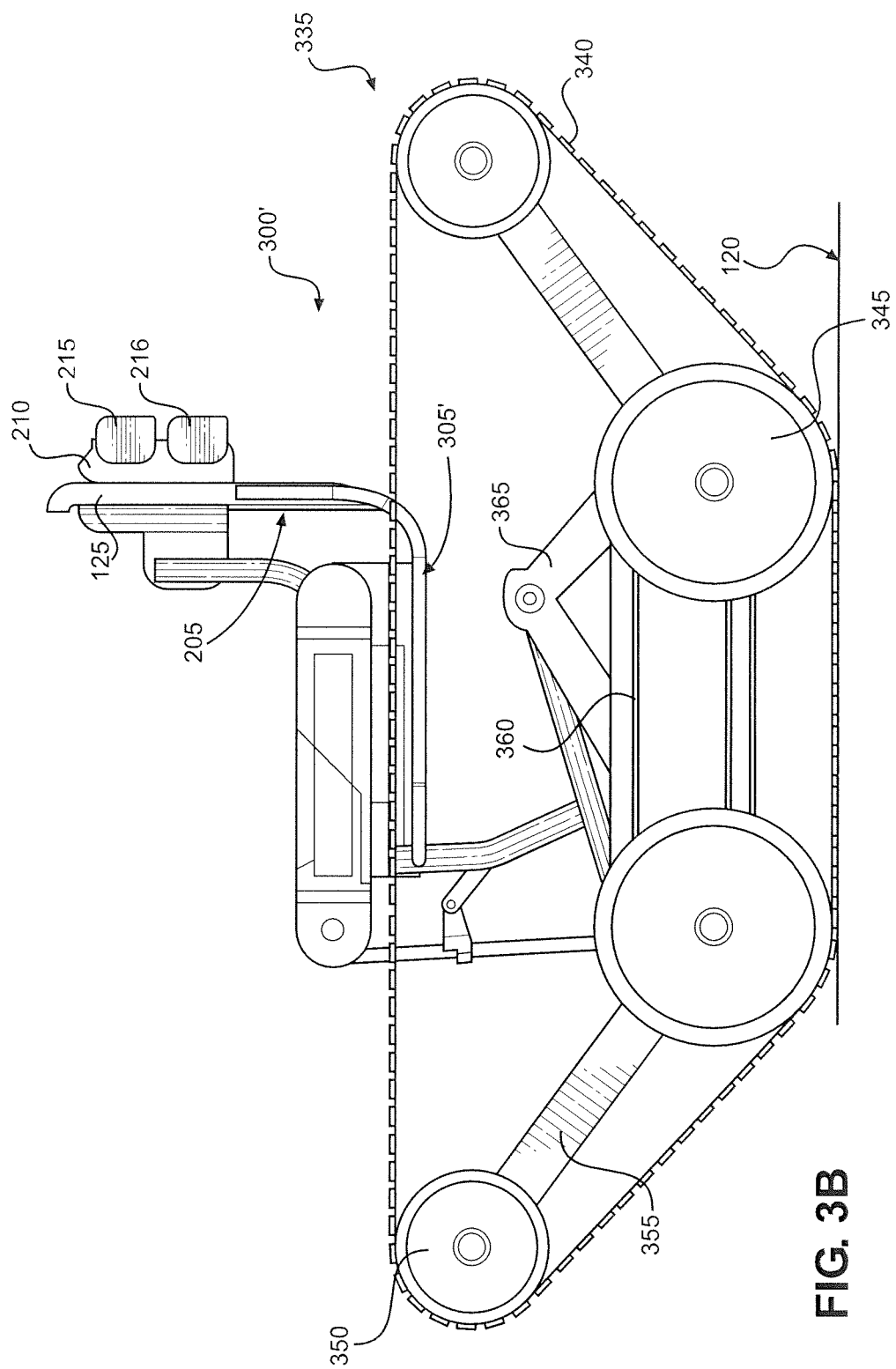
FIG. 3B is a side view of a fully tracked, wheelchair-like mobility device, mounted with additional exoskeleton-compatible and detachable EMODs, constructed in accordance with the second embodiment, with the chair portion of the mobility device shown in a seated position.

An alternative track design, in which all wheels of the mobile base are replaced with one larger track system, is shown in FIG. 3B. A tracked base 300' includes exoskeleton support 205, a base frame 305' and a propulsion system 335. Propulsion system 335 includes a track 340, drive wheels 345, guide wheels 350, suspension arms 355, a drive mechanism 360, and a support structure 365. Base frame 305' is connected to propulsion system 335 at support structure 365. In some embodiments, various springs, dampers, bearings, and other suspension members exist between components of propulsion system 335, support structure 365, and base frame 305' in order to provide for a smoother ride or assist in traversing uneven or sloping terrain.

In some embodiments, the track in continuous. In other embodiments, the track is not continuous. In addition, the track can be articulated or adjustable as with the tracked devices described in U.S. Pat. Nos. 6,263,989 and 8,333,256, which are incorporated herein by reference. In some embodiments, the propulsive portion of a wheeled exoskeleton mobility device can be interchanged with the propulsive portion of a tracked exoskeleton mobility device, and vice versa. In addition to wheelchair-like devices, the present invention can be used with devices having more than 4 wheels, with these wheels variously articulated and suspended relative to each other and the chassis of the vehicle, such as those shown in U.S. Pat. Nos. 5,323,867 and 8,260,459, which are incorporated herein by reference. For purposes of the present invention, the terms "mobile base" and "mobile exoskeleton base" refer to any of the plurality of potential wheeled or tracked exoskeleton bases usable in connection with the present invention.

As an example of the second embodiment of the present invention, consider a disabled person using an exoskeleton and wheeled base for mobility purposes in winter. Use of the device of the second embodiment would allow for safer and/or faster travel, relative to a wheeled base or ambulatory exoskeleton, over certain slippery surfaces, such as ice- or snow-covered sidewalks. Similarly, the device of the second embodiment would have traction advantages over slick, muddy surfaces.

Figure 4A:
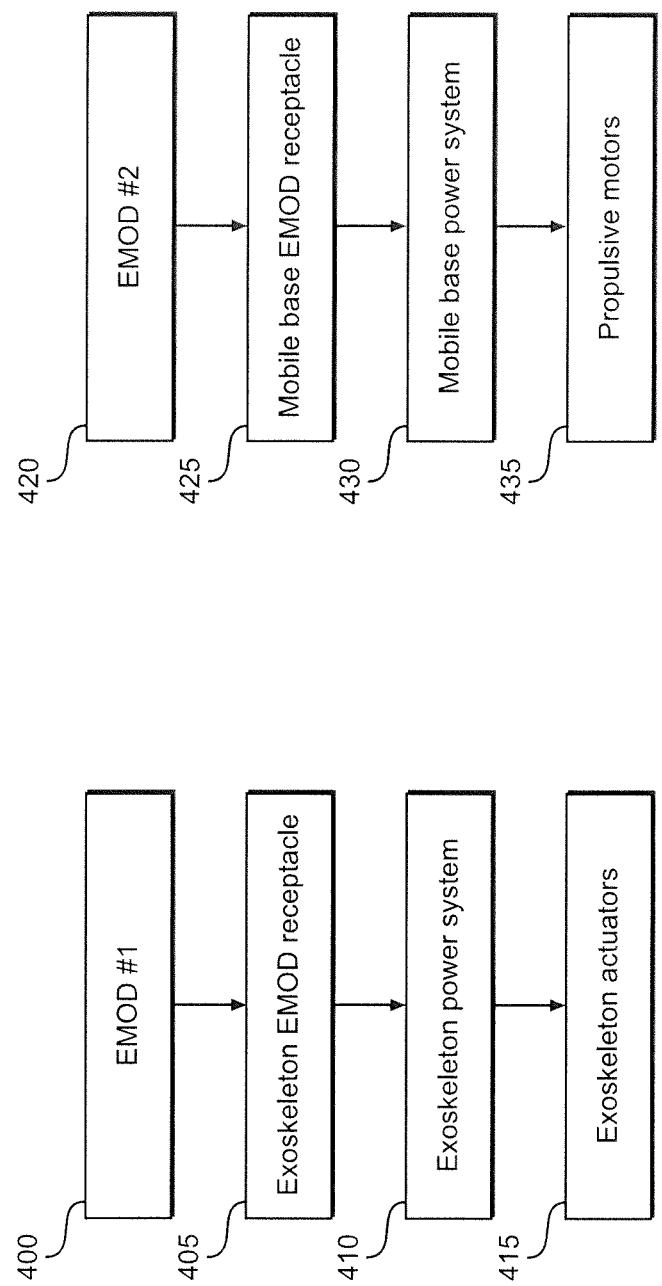
FIG. 4A is a schematic diagram of a third embodiment of the present invention, showing the interactions of an exoskeleton and a mobile base with an EMOD power sharing system.
Figure 4B:
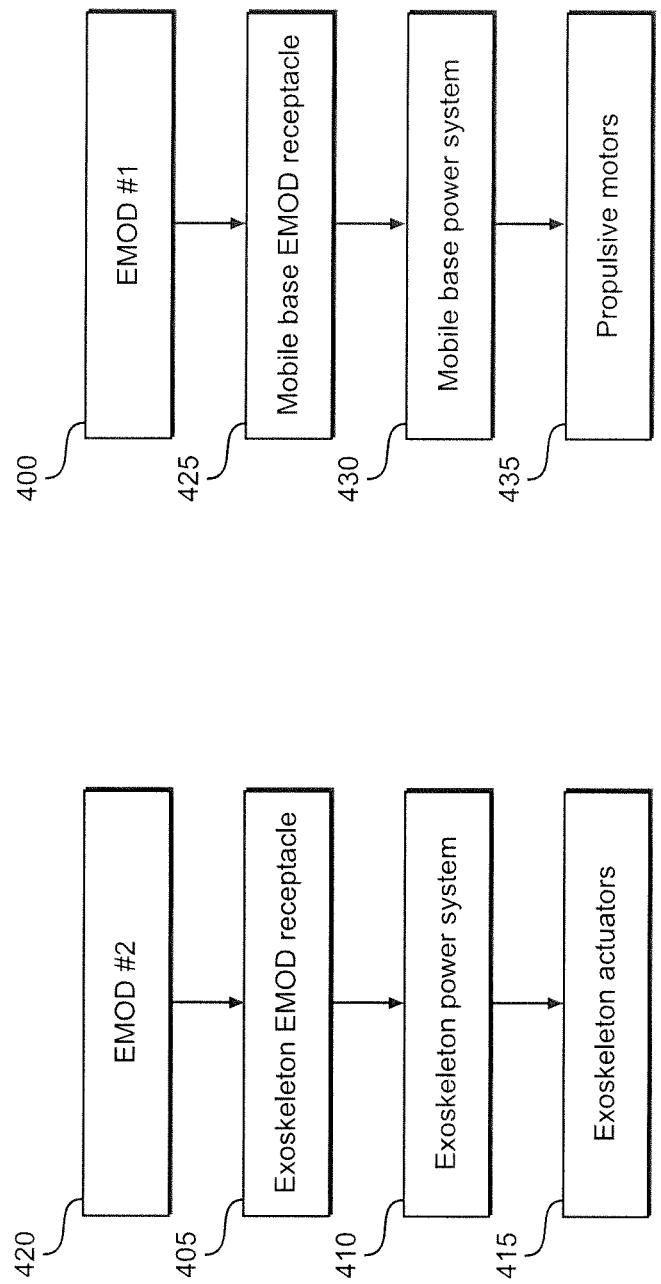
FIG. 4B is a schematic diagram of the third embodiment, with the EMODs being arrayed in a different configuration relative to that shown in FIG. 4A.

A third embodiment of the present invention is shown in FIGS. 4A and 4B. With initial reference to FIG. 4A, a first EMOD 400 is affixed to an exoskeleton EMOD receptacle 405 and provides power to an exoskeleton power system 410. Exoskeleton power system 410 transfers this power to exoskeleton actuators 415, resulting in movement of the exoskeleton (as well as a user coupled thereto) across a support surface. A second EMOD 420 is affixed to mobile base EMOD receptacle 425 and provides power to mobile base power system 430. Mobile base power system 430 transfers this power to propulsive motors 435, resulting in movement of the mobile base (as well as the exoskeleton and user coupled thereto) across a support surface. Since the EMODs that power the exoskeleton and mobile base are interchangeable, the user can exchange first EMOD 400 and second EMOD 420, as shown in FIG. 4B, where second EMOD 420 is affixed to exoskeleton EMOD receptacle 405 and first EMOD 400 is affixed to mobile base EMOD receptacle 425. As a result, second EMOD 420 provides power to exoskeleton power system 410 and first EMOD 400 provides power to mobile base power system 430. In some embodiments, the exoskeleton includes multiple EMOD receptacles. In some embodiments, the mobile base includes multiple EMOD receptacles. In a preferred embodiment, the EMODs stored on the mobile base are located such that they can be easily reached by the user while the user is seated in the exoskeleton on the mobile base. Preferably, the EMODs are mounted securely enough as to prevent accidental displacement during movement but not so securely as to be difficult for the user to remove.

As an example of the third embodiment of the present invention, consider a disabled person who is using an exoskeleton and mobile base as a personal mobility device, with the person wearing the exoskeleton and sitting in the mobile base. In such a scenario, the exoskeleton does not need significant power. Accordingly, as the mobile base power is depleted with use, the user can exchange the charged EMOD from the exoskeleton with the depleted EMOD of the mobile base, thereby providing additional range to the mobile base.

Figure 5A:
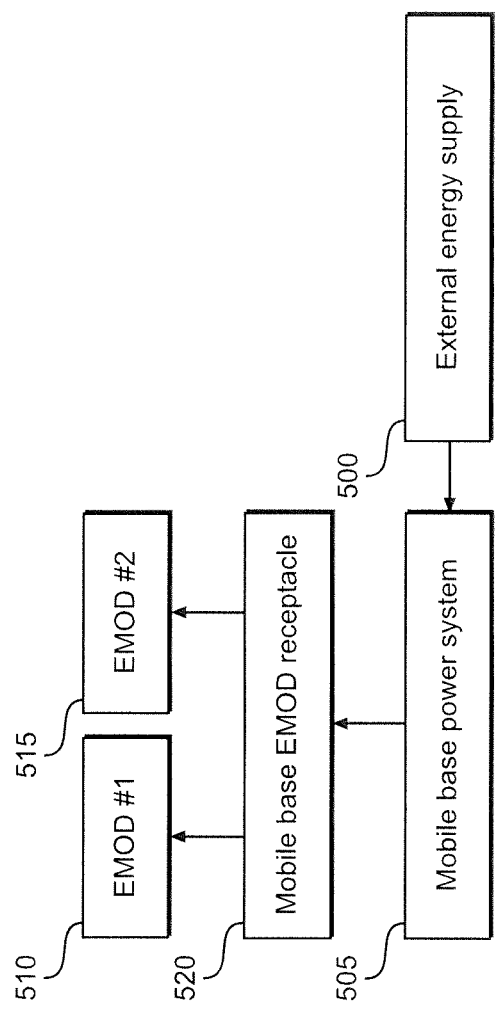
FIG. 5A is a schematic diagram of a fourth embodiment of the present invention showing the linkage of the mobile base to an external energy supply for charging EMODs mounted on the mobile base.
Figure 5B:
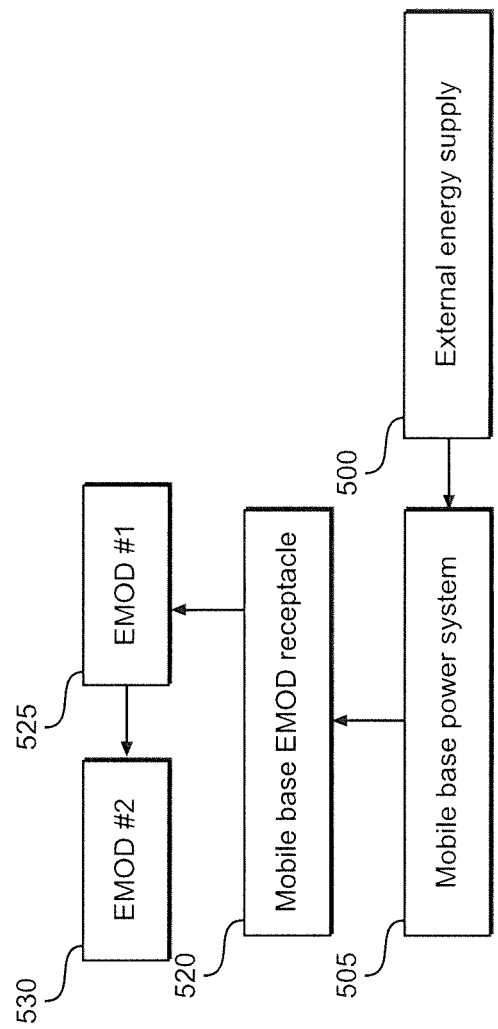
FIG. 5B is a schematic diagram of the fourth embodiment, with an EMOD being connected to and charged by another EMOD drawing power directly from the mobile base.
Figure 5C:
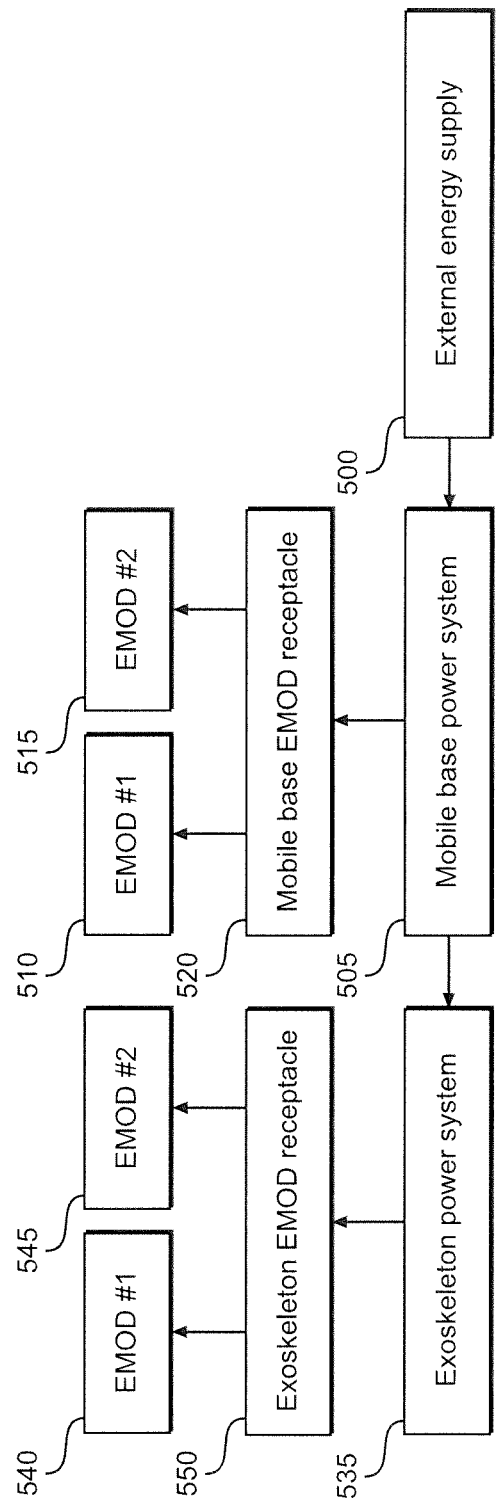
FIG. 5C is a schematic diagram of the fourth embodiment, showing the linkage of the mobile base to the external energy supply for charging EMODs mounted on either the mobile base or an exoskeleton coupled to the mobile base.
Figure 5D:
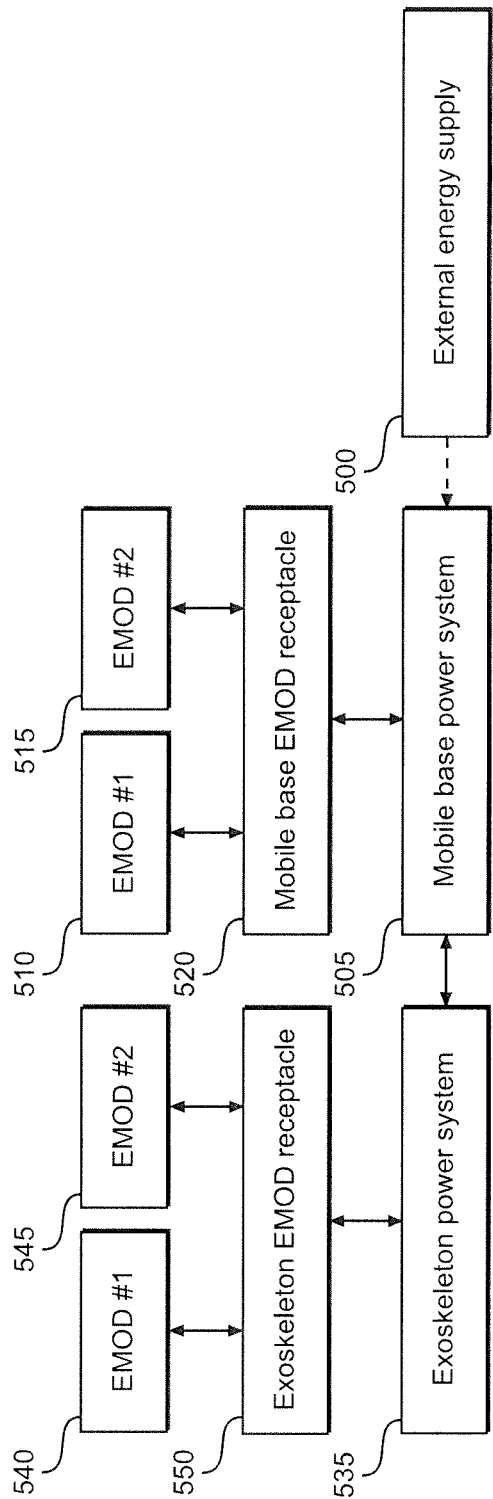
FIG. 5D is a schematic diagram of the fourth embodiment, showing the linkage of the power systems of the mobile base and exoskeleton, which allows for internal energy sharing, including charging EMODs mounted on either the mobile base or the exoskeleton.

A fourth embodiment of the present invention is shown in FIGS. 5A-H. With initial reference to FIG. 5A, a mobile base acts as an EMOD charging interface. In particular, an external energy supply (or source) 500 provides power to a mobile base power system 505, which charges a first EMOD 510 and a second EMOD 515 through a mobile base EMOD receptacle 520. In FIG. 5B, external energy supply 500 provides power to mobile base power system 505, with power from mobile base power system 505 being used by mobile base EMOD receptacle 520 to charge a first EMOD 525. A second EMOD 530 draws power from first EMOD 525. In FIG. 5C, the mobile base acts as both an EMOD charging interface and as a conduit of power to an exoskeleton affixed to the mobile base. This can provide power to exoskeleton systems and allow charging of EMODs affixed to the exoskeleton. Specifically, external energy supply 500 provides power to mobile base power system 505, which charges first EMOD 510 and second EMOD 515 in mobile base EMOD receptacle 520. If an exoskeleton is affixed to the mobile base, mobile base power system 505 also supplies power to an exoskeleton power system 535, which charges a first EMOD 540 and a second EMOD 545 in an exoskeleton EMOD receptacle 550. In some embodiments, such as that shown in FIG. 5D, mobile base power system 505 and exoskeleton power system 535 are linked so as to allow for internal energy sharing amongst power systems 505 and 535, including charging EMODs mounted on either the mobile base or the exoskeleton. For example, power can be drawn from first EMOD 510 to charge first EMOD 540 and vice versa.

Figure 5G:
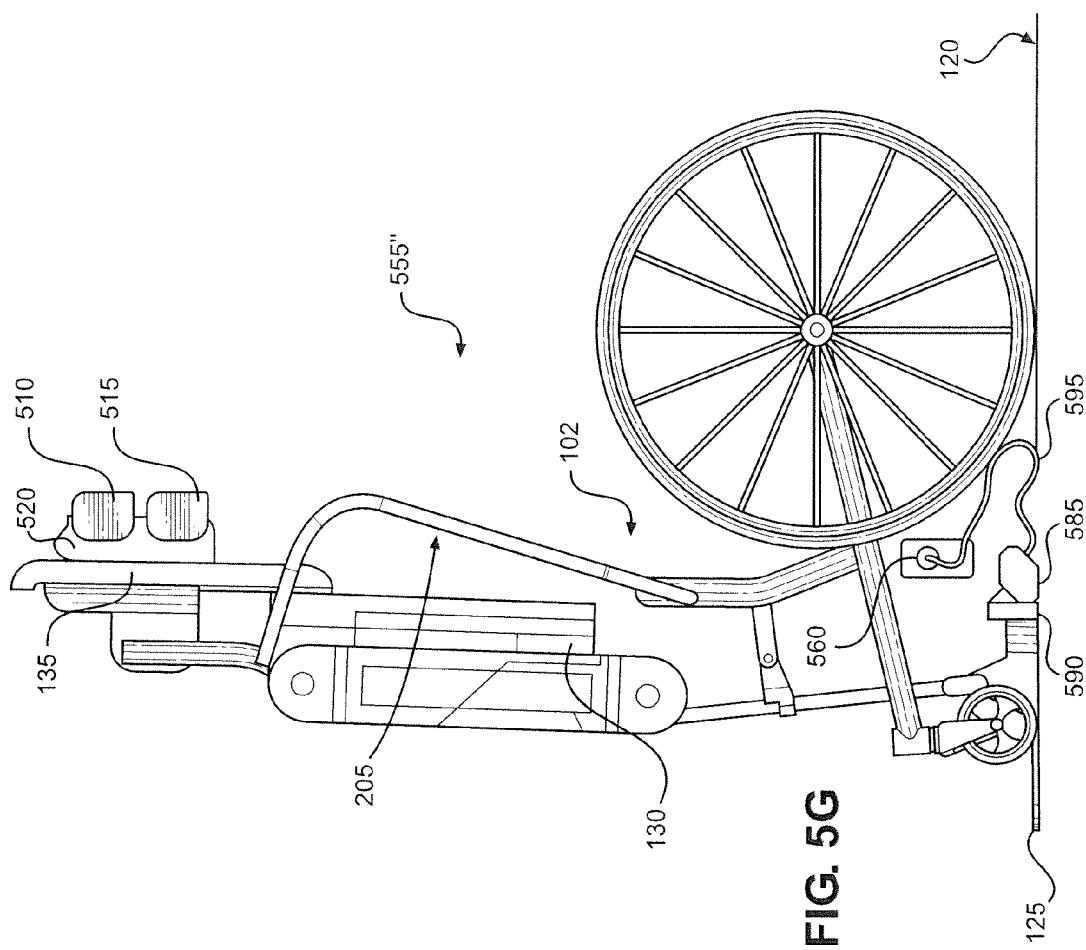
FIG. 5G is a side view of the mobile base drawing power from an external source in accordance with the fourth embodiment, with the mobile base being mounted with additional exoskeleton-compatible and detachable EMODs, and the mobile base being connected to the external power source by a floor-level docking port that attaches to a surface interaction structure of the mobile base, thereby allowing for recharging of the EMODs.

In FIG. 5E, a mobile base 555 constructed in accordance with the fourth embodiment is shown drawing power from an external energy supply in the form of a wall outlet 560. The power travels through a flexible conduit 565 and into mobile base EMOD receptacle 520. In FIG. 5F, a mobile base 555' is connected to a wall-mounted docking port 570 by a docking interface 575, with wall-mounted docking port 570 drawing power from wall outlet 560 through a flexible conduit 580 and relaying this power through docking interface 575 into mobile base EMOD receptacle 520. The power relayed to mobile base EMOD receptacle 520 in FIGS. 5E and 5F is then transferred to mobile base power system 505 (not visible) and/or EMODS 510 and 515. In FIG. 5G, a mobile base 555" is connected to a surface-mounted docking port 585 by a docking interface 590, with surface-mounted docking port 585 drawing power from wall outlet 560 through a flexible conduit 595 and relaying this power through docking interface 590 and mobile base power system 505 (not visible) into mobile base EMOD receptacle 520.

In some embodiments, external energy supply 500 is an electrical wall socket, compressed gas or liquid vessel, solar generating module, electrical battery, fuel cell, combustion engine generator, or any other energy supply not mounted to the mobile base 555. In some embodiments, energy is transferred using an electrical cable with connectors, direct contact electrical connectors with no cable, inductive or resonant inductive coupling between two inductive coils, pressure hose and connectors, or any other means known in the art. Power sharing can be engaged while the exoskeleton is connected to mobile base 555 in a seated, upright, or intermediate configuration. Mobile base 555 can selectively charge EMODs docked on mobile base 555 and/or the exoskeleton as desired by a user or as controlled by algorithms implemented in exoskeleton and/or mobile base systems. In one preferred embodiment, a pairing method between a mobile base and an external energy source includes a charging pad that rests on the floor and is connected to a standard electrical wall socket to provide power to a mobile base EMOD receptacle using electrical resonant inductive coupling. Similarly, a preferred embodiment of a pairing method between a mobile base and an attached exoskeleton utilizes electrical resonant inductive coupling.

Figure 5H:
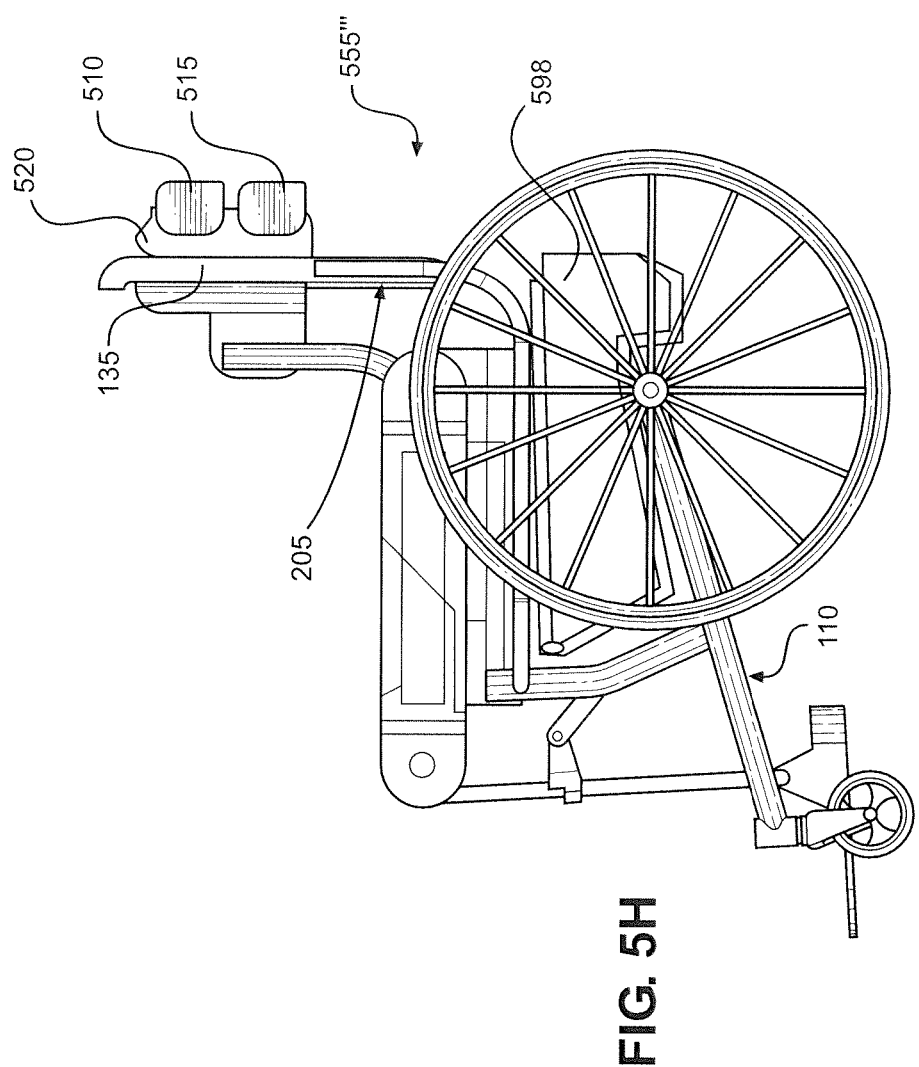
FIG. 5H is a side view of the mobile base that is mounted with a small generator in accordance with the fourth embodiment, with the mobile base being mounted with additional exoskeleton-compatible and detachable EMODs, and the mobile base receiving power from the small generator to charge EMODs or power other connected systems.

In another embodiment, shown in FIG. 5H, the "external" power source is a small electric generator 598 mounted on wheeled base frame 110 of a mobile base 555'''. In this embodiment, mobile base 555''' can recharge EMODs through use of an internal combustion engine of generator 598 when the exoskeleton and user are remote from and not coupled to mobile base 555'''. In another embodiment, external energy can be provided to a mobile base through regenerative braking while the mobile base is rolling down a slope, for example. Similarly, if the user has the ability to provide muscular energy input, the user can spin the wheels of the mobile base to provide regenerative power.

As an example of the fourth embodiment of the present invention, consider a disabled person that is using an exoskeleton and mobile base for mobility purposes in an office environment. This person can travel to work using an exoskeleton coupled to a self-propelled mobile base, then exit the mobile base and use the exoskeleton for mobility while in the office. Through use of the device of the fourth embodiment, the mobile base can access stationary power sources, such as electric wall outlets, to charge additional EMODs, thereby providing the person with a supply of charged EMODs over the course of the workday, as well as charged EMODs to power the mobile base for returning home from work.

Figure 6A:
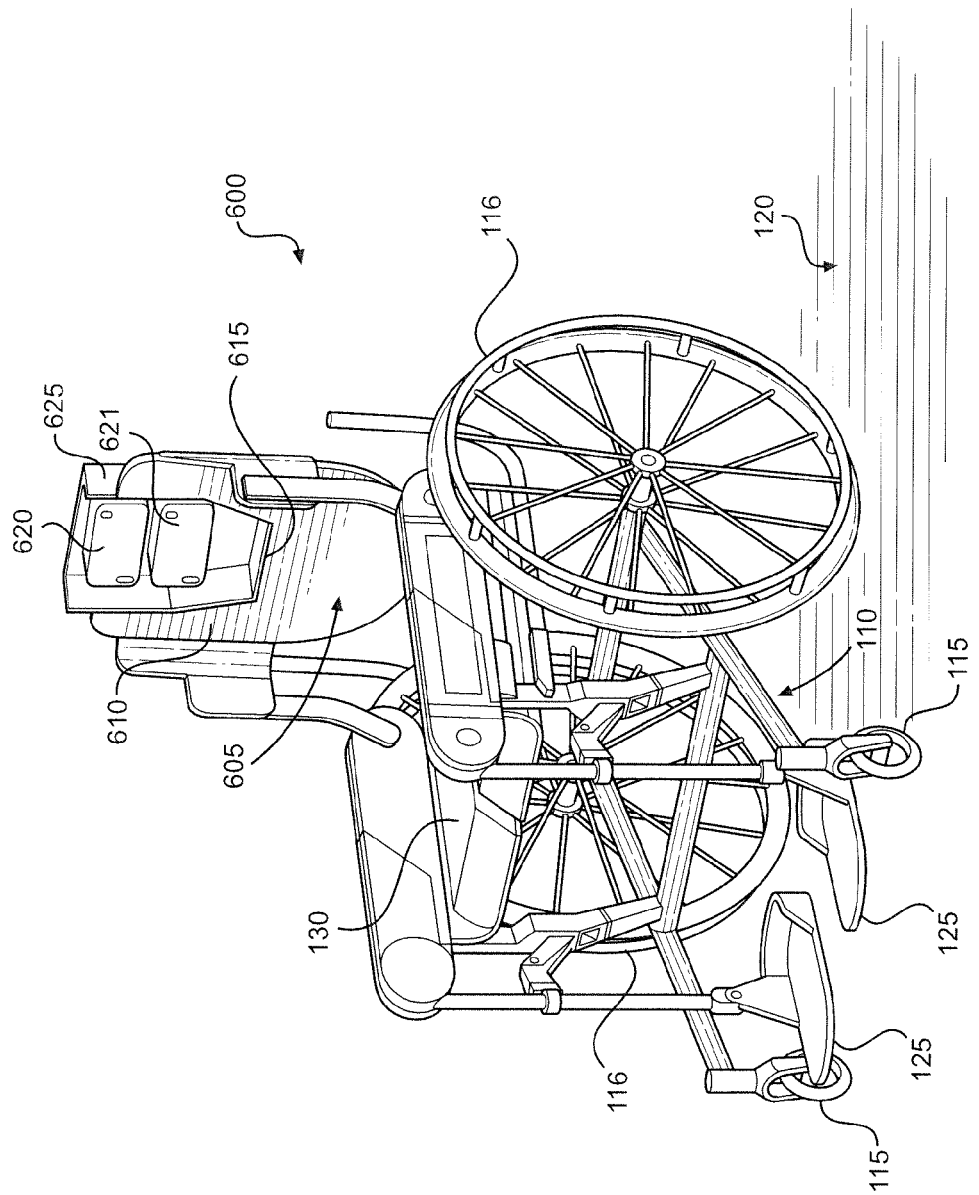
FIG. 6A is a perspective view of a mobile base device, mounted with exoskeleton-compatible EMODs, constructed in accordance with a fifth embodiment of the present invention in which automated mechanisms of the mobile base can exchange EMODs between an exoskeleton and the mobile base when the exoskeleton is coupled to the mobile base.
Figure 6B:
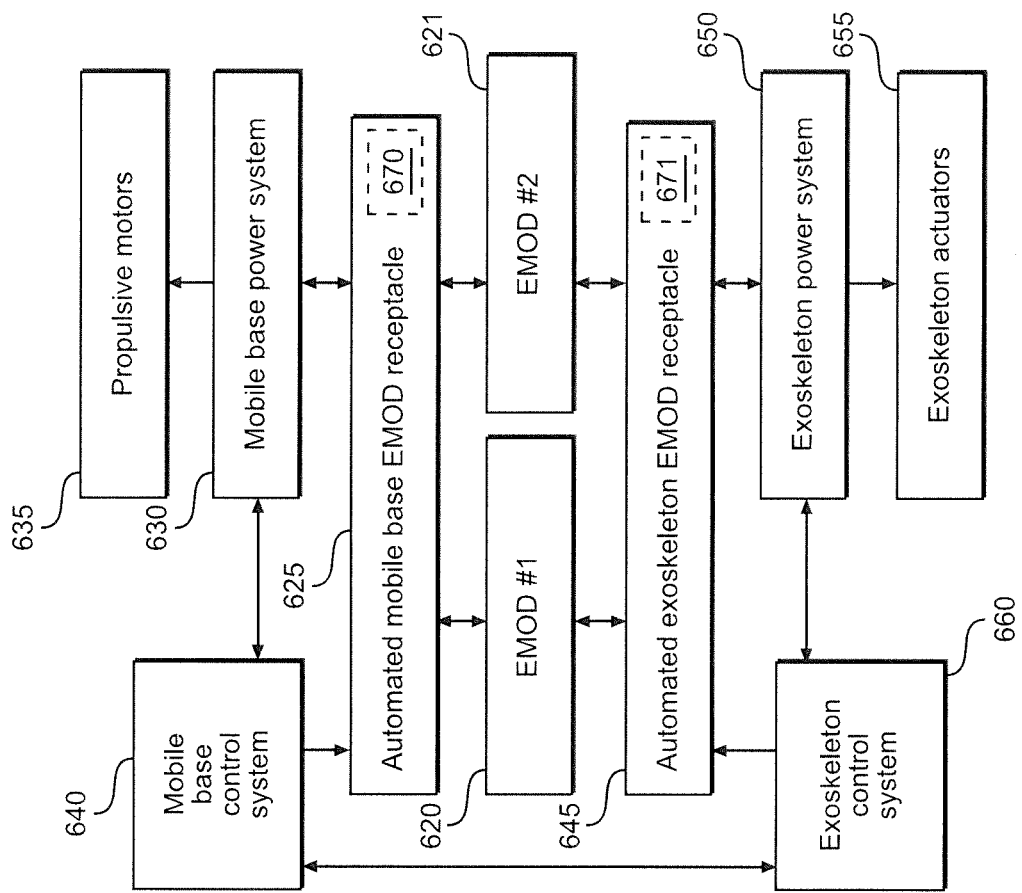
FIG. 6B is a schematic diagram of the fifth embodiment, showing the linkage of the EMODs to automated EMOD receptacles in both the exoskeleton and the mobile base as well as the communication between the power and control systems of the exoskeleton and mobile base, with the exoskeleton coupled to the mobile base and the EMODs affixed to the automated EMOD receptacles of both the exoskeleton and mobile base.

A fifth embodiment of the present invention is shown in FIGS. 6A-G. Specifically, FIG. 6A shows a mobile base 600 constructed in accordance with the fifth embodiment. Mobile base 600 includes an exoskeleton support 605 and wheeled base frame 110. A seat back 610 of exoskeleton support 605 has a recessed area 615 in which a first EMOD 620 and a second EMOD 621 are mounted to an automated mobile base EMOD receptacle 625. FIG. 6B shows the systems in communication when a compatible exoskeleton is coupled to mobile base 600. Automated mobile base EMOD receptacle 625 is connected to EMODs 620 and 621, which provide power to a mobile base power system 630 to drive propulsive motors 635. Mobile base power system 630 determines the remaining power in EMODs 620 and 621 and reports this data to a mobile base control system 640. EMODs 620 and 621 are also connected to an automated exoskeleton EMOD receptacle 645, with EMODs 620 and 621 providing power to an exoskeleton power system 650 to drive exoskeleton actuators 655. Exoskeleton power system 650 determines the remaining power in EMODs 620 and 621 and reports this data to an exoskeleton control system 660. Mobile base control system 640 controls automated mobile base EMOD receptacle 625, which can automatically and selectively couple and decouple EMODs 620 and 621. Similarly, exoskeleton control system 660 controls automated exoskeleton EMOD receptacle 645, which can automatically and selectively couple and decouple EMODs 620 and 621. Mobile base control system 640 and exoskeleton control system 660 are in communication and coordinate which of EMODs 620 and 621 is coupled to each EMOD receptacle 625, 645 immediately prior to separation of the exoskeleton and mobile base 600. This determination can be made based on the remaining power in EMODs 620 and 621, for example.

Figure 6C:
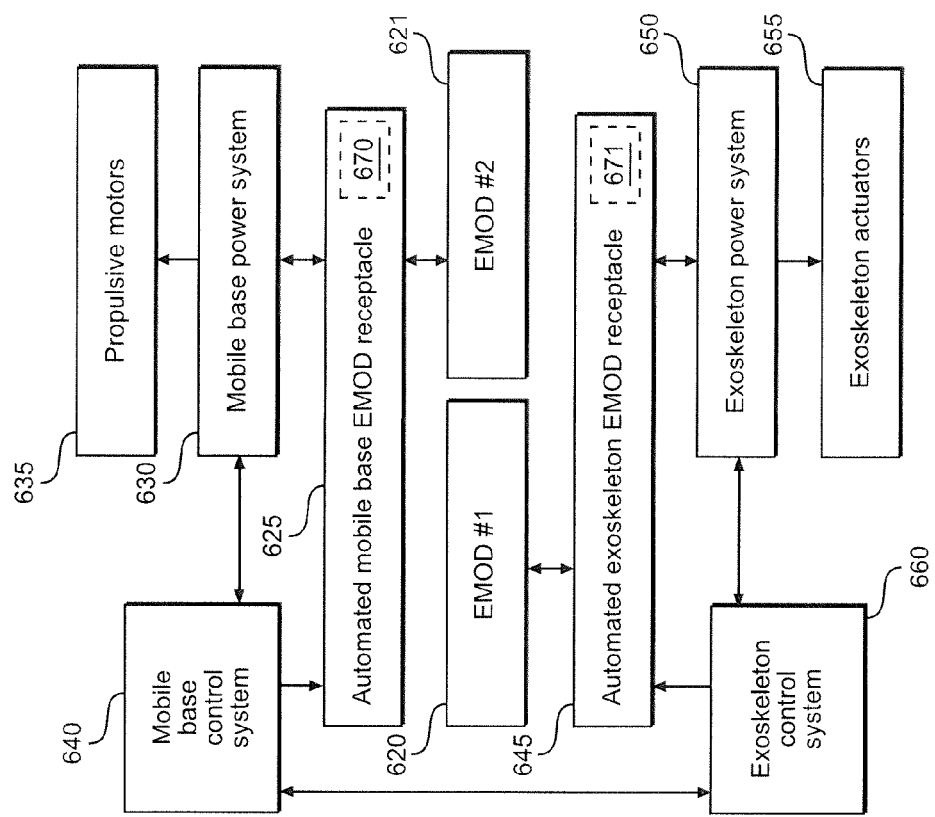
FIG. 6C is a schematic diagram of the fifth embodiment, with the exoskeleton decoupled from the mobile base, one EMOD affixed to the exoskeleton automated EMOD receptacle and one EMOD affixed to the mobile base automated EMOD receptacle.
Figure 6D:
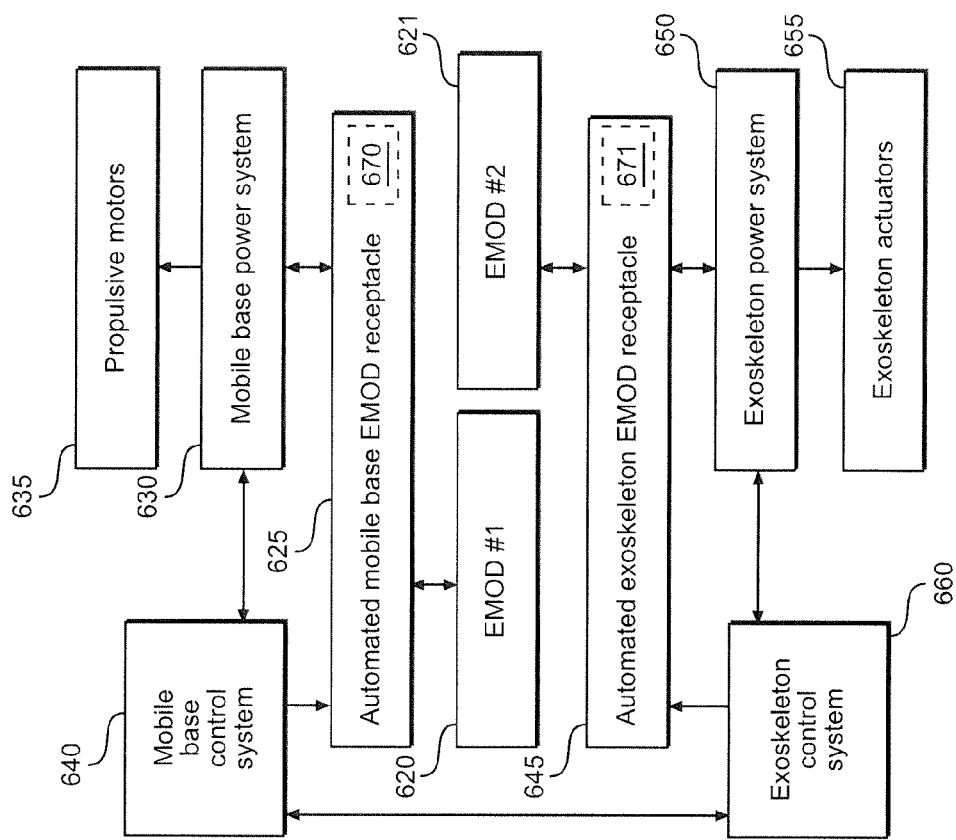
FIG. 6D is a schematic diagram of the fifth embodiment, with the exoskeleton decoupled from the mobile base, and with an alternative configuration of one EMOD affixed to the exoskeleton automated EMOD receptacle and one EMOD affixed to the mobile base automated EMOD receptacle.
Figure 6E:
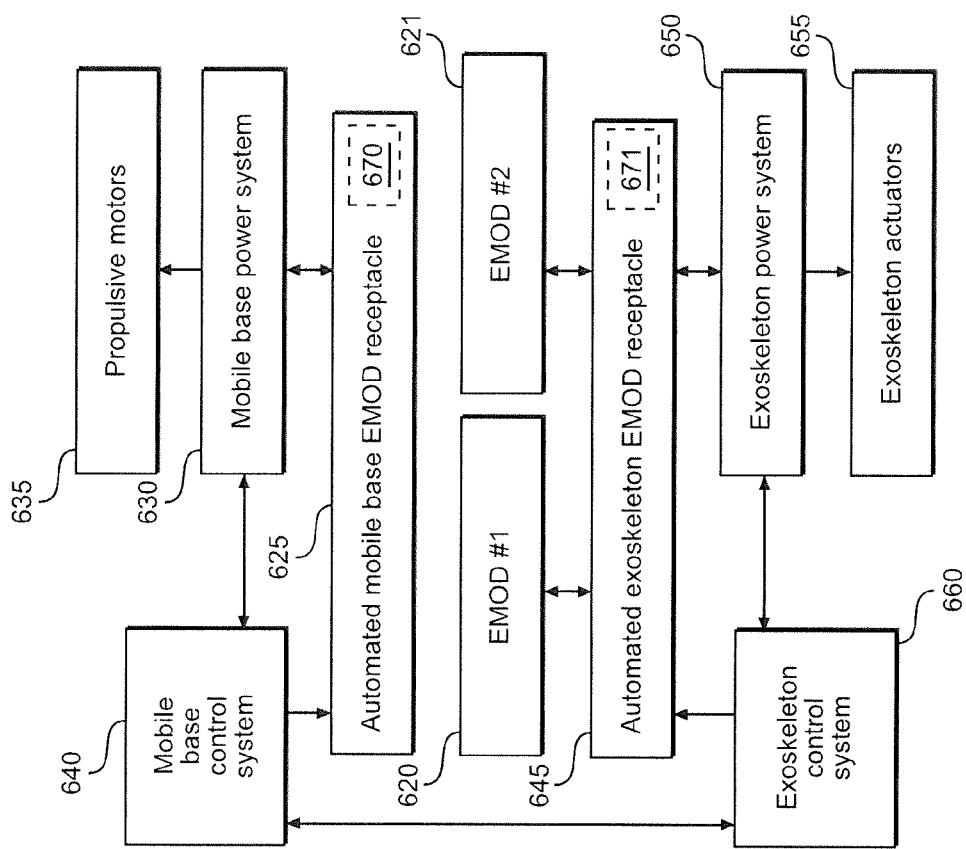
FIG. 6E is a schematic diagram of the fifth embodiment, with the exoskeleton decoupled from the mobile base and two EMODs affixed to the exoskeleton automated EMOD receptacle.
Figure 6F:
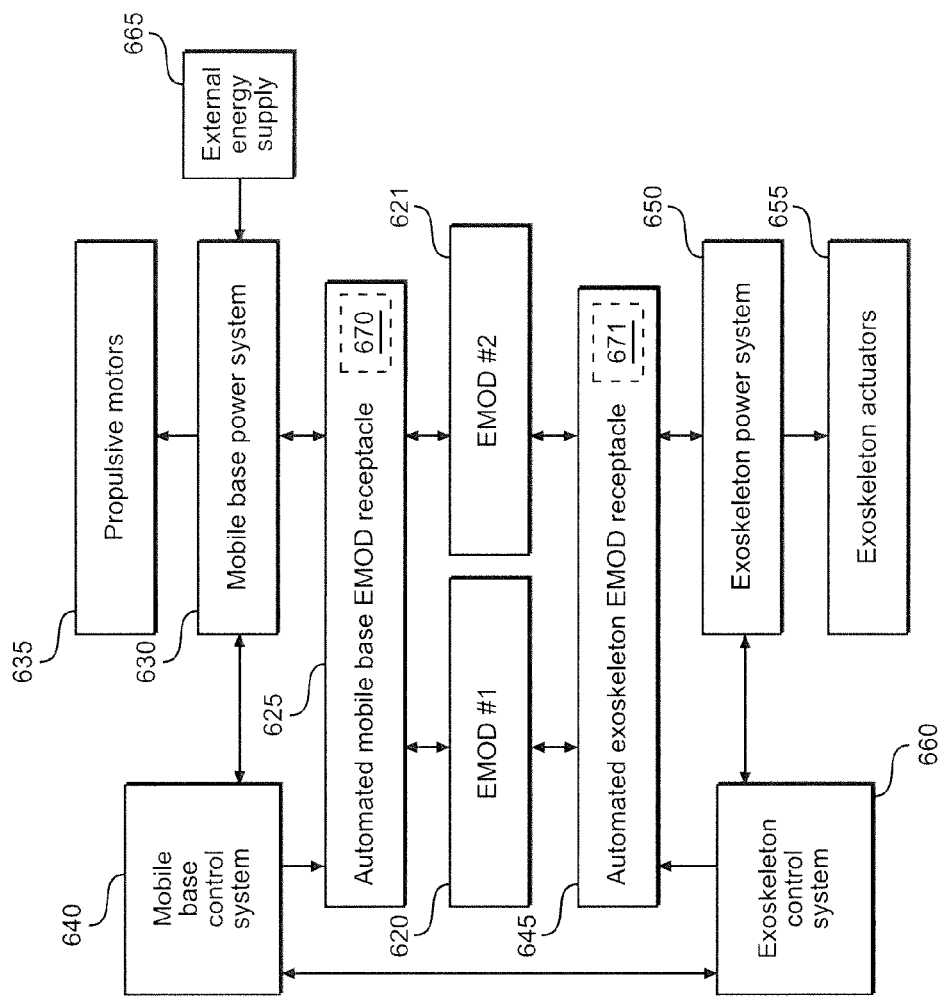
FIG. 6F is a schematic diagram of the fifth embodiment, with the exoskeleton coupled to the mobile base, the mobile base connected to an external power supply and the EMODs affixed to the automated EMOD receptacles of both the exoskeleton and mobile base.
Figure 6G:
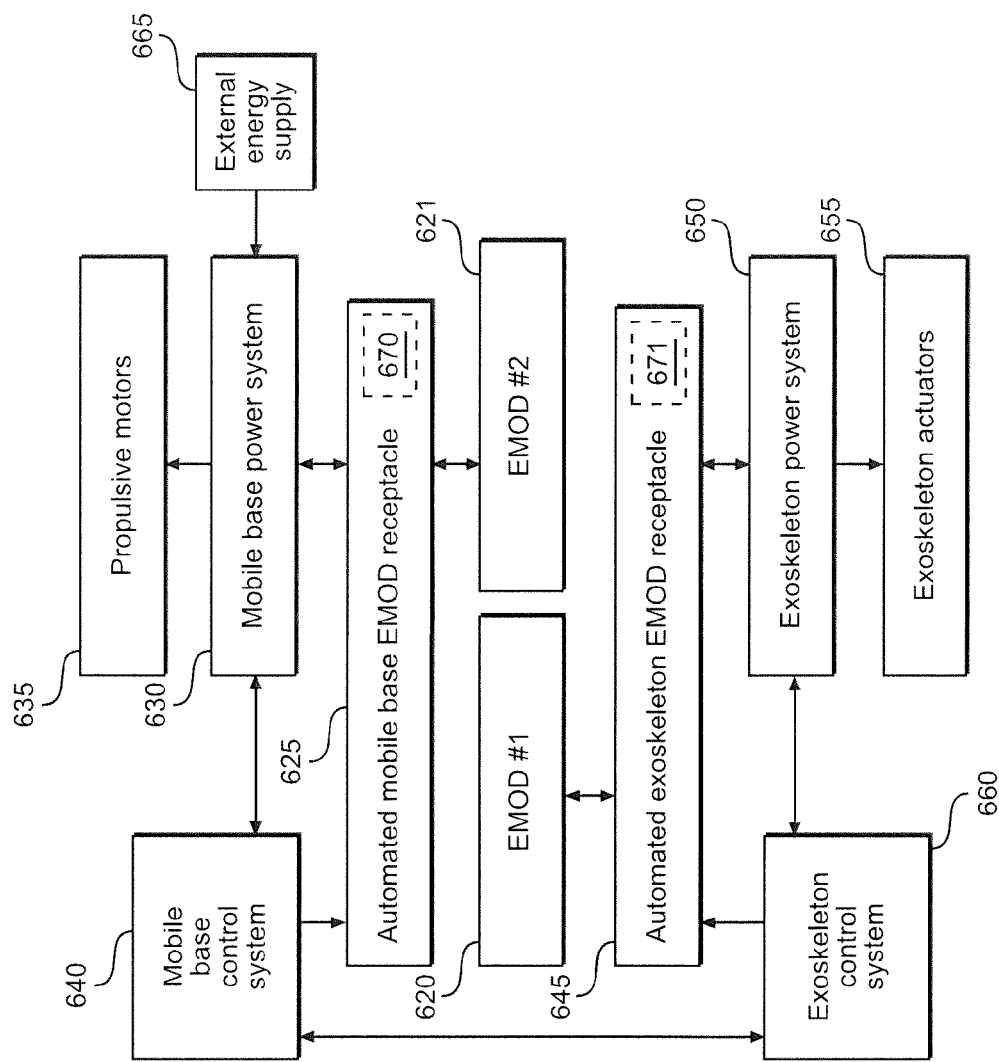
FIG. 6G is a schematic diagram of the fifth embodiment, with the exoskeleton decoupled from the mobile base, one EMOD affixed to the automated EMOD receptacle of the exoskeleton, one EMOD affixed to the automated EMOD receptacle of the mobile base and the mobile base connected to an external power supply.

Upon separation of the exoskeleton and mobile base 600, a variety of EMOD configurations are possible. FIG. 6C shows one EMOD each on the exoskeleton and mobile base 600, with first EMOD 620 being used to power the exoskeleton and second EMOD 621 remaining on mobile base 600. After some use of the exoskeleton, first EMOD 620 might be largely discharged and in need of replacement. The exoskeleton user then rejoins the exoskeleton to mobile base 600, returning to the configuration shown in FIG. 6B in which control systems 640 and 660 will assess the power remaining in each EMOD 620, 621. Control systems 640 and 660 then direct the automated EMOD receptacles 625, 645 to reassign EMODs 620 and 621 such that, prior to the next mobile base-exoskeleton separation, second EMOD 621 is affixed to automated exoskeleton EMOD receptacle 645 to power the exoskeleton and first EMOD 620 is affixed to mobile base 600, as shown in FIG. 6D. Alternatively, both EMODs 620, 621 can be affixed to automated exoskeleton EMOD receptacle 645 and provide power for the exoskeleton, as shown in FIG. 6E. FIGS. 6F and 6G show the addition of an external energy supply 665 to this system. This allows all EMODs to be charged when the exoskeleton is coupled to mobile base 600, as shown in FIG. 6F, and allows EMODs affixed to mobile base 600 (e.g., second EMOD 621) to be charged when the exoskeleton is uncoupled from mobile base 600, as shown in FIG. 6G. In some embodiments, more than two EMODs are used in the automated EMOD sharing and transfer system. In some embodiments, auxiliary (non-EMOD) power storage exists on either mobile base 600 or the exoskeleton to allow the corresponding automated EMOD receptacle to accept an EMOD when no EMOD is affixed to power the automated system. In some embodiments, manual mechanisms allow the attachment and detachment of EMODs without a power requirement. Preferably, one or both of automated EMOD receptacles 625 and 645 includes an automated EMOD transfer mechanism 670, 671 for automatically transferring EMODs 620 and 621 between automated EMOD receptacles 625 and 645. Automated EMOD transfer mechanisms 670 and 671 can make use of mechanical, electromagnetic, or any of a plurality of means for attachment of EMODs to the automated receptacles and for formation of electrical or other contact required for use of EMOD energy by exoskeleton or mobile base systems.

As an example of the fifth embodiment of the present invention, consider a severely disabled person, such as a person afflicted by a serious stroke, who is using an exoskeleton for mobility purposes. This person may lack the flexibility and strength to manually change EMODs, either from a seated or standing position. Through use of the device of the fifth embodiment, the person can exchange exoskeleton EMODs simply by coupling the exoskeleton to a mobile base, either in a standing or seated position, allowing the automated systems to remove the depleted EMOD from and affix a charged EMOD to the exoskeleton. At this point, the person decouples the exoskeleton from the mobile base, with a fully-charged EMOD affixed to and powering the exoskeleton and the depleted EMOD retained by the mobile base where it can be charged if the mobile base is connected to an external energy supply. Such a system may also be more convenient than manual EMOD exchange for a less disabled person or even for an able-bodied person wearing an industrial or military exoskeleton. One additional advantage of such a system is that it allows not only the exoskeleton user but also the exoskeleton control system (or the mobile base control system or a remote server) to predict and determine which EMOD configuration provides the optimal power-to-weight ratio for the exoskeleton for a given situation or task.

Figure 7:
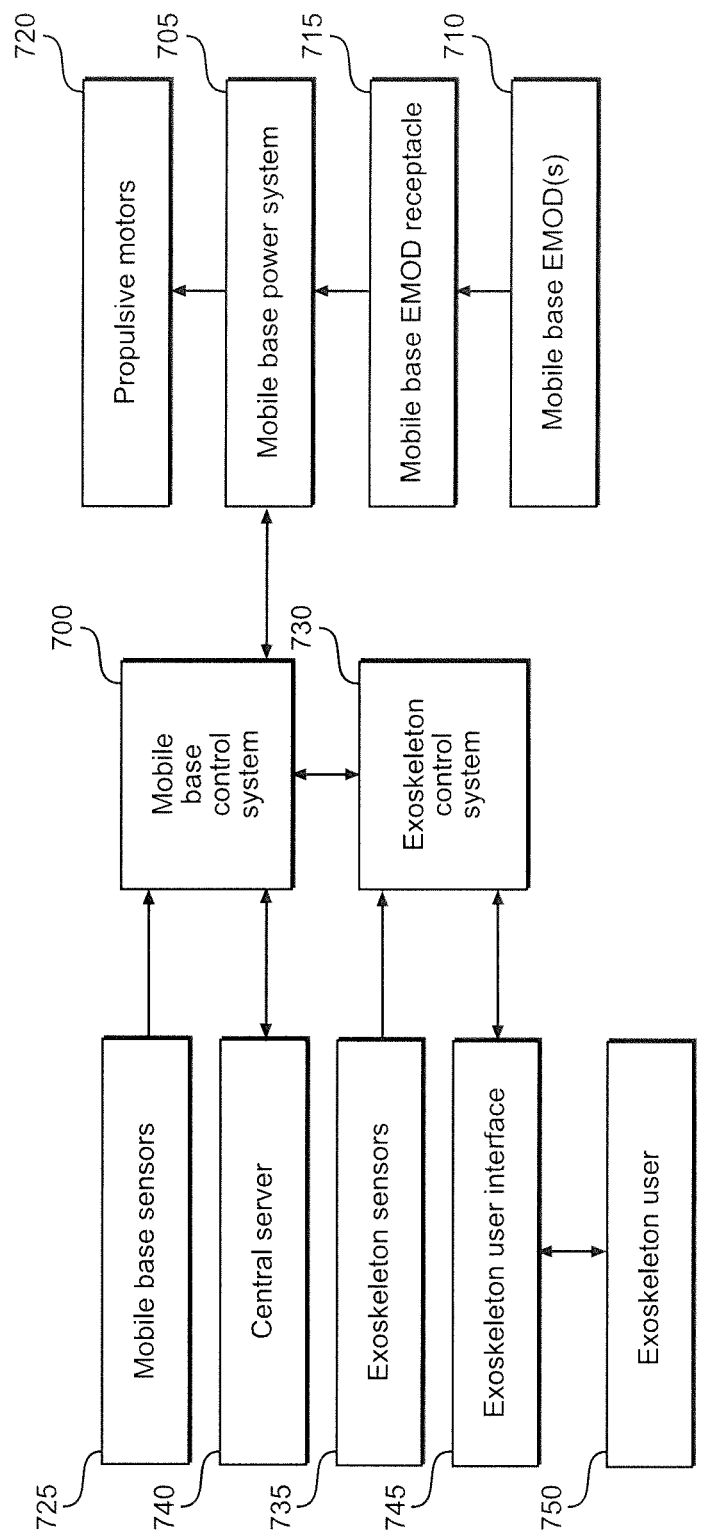
FIG. 7 is a schematic diagram of a sixth embodiment of the present invention, showing systems in communication to allow for remotely directed movement of a mobile base.

With reference now to FIG. 7, a sixth embodiment of the present invention is illustrated in which a mobile base is controlled remotely by a user, automatically by strategies programmed in exoskeleton and mobile base system computers in response to certain inputs or stimuli, or by commands issued from a central server. In particular, a mobile base control system 700 is in communication with, and issues commands to, a mobile base power system 705. Mobile base power system 705 uses power from mobile base EMOD(s) 710, transferred through a mobile base EMOD receptacle 715, to drive the motion of propulsive motors 720, thereby causing movement of the mobile base. Mobile base control system 700 receives data on mobile base state, position, and, in some embodiments, environment from mobile base sensors 725. Similarly, an exoskeleton control system 730 receives data on exoskeleton state, position, and, in some embodiments, environment from exoskeleton sensors 735. Mobile base control system 700 is in communication with exoskeleton control system 730 and/or a central server 740. Exoskeleton control system 730 is in communication with an exoskeleton user interface 745, which relays data to and receives commands from an exoskeleton user 750. In some embodiments, the communication with mobile base control system 700 is remote. Through this communication network, commands can be issued to mobile base control system 700, causing the engagement of mobile base power system 705 and propulsive motors 720 so as to change the position of mobile base position as desired by exoskeleton user 750, automatically by strategies programmed in the exoskeleton and mobile base system computers, or by commands issued from central server 740. In other words, in one example, exoskeleton user 750 can issue commands to exoskeleton user interface 745, with these commands being passed from exoskeleton user interface 745 to mobile base control system 700 through exoskeleton control system 730. Mobile base control system 700 then causes movement of the mobile base based on the commands. In other examples, mobile base control system 700 causes movement of the mobile base based on data received from exoskeleton control system 730 or central server 740.

In some embodiments, the remote-controlled or automatic mobility system moves the mobile base to assist in coupling of the exoskeleton to or uncoupling of the exoskeleton from the mobile base. In some embodiments, the system moves the mobile base to a location away from the user after uncoupling, such as a docking port for charging or a storage location. In some embodiments, the mobile base follows the exoskeleton while the exoskeleton is being used to walk such that if the user loses his or her balance the exoskeleton can perform a controlled sit into the mobile base. In some embodiments, the mobile base moves to the user wearing the exoskeleton system when the exoskeleton-mounted EMOD energy level is low enough that the exoskeleton would soon need to cease operation, allowing the exoskeleton EMOD to be swapped or the exoskeleton to be coupled to the mobile base for alternative mobility using the mobile base. In some embodiments, the mobile base follows the exoskeleton while being used for load carriage so that the exoskeleton and user can more easily transport a heavy or awkward load without unbalancing the walking exoskeleton and user. In other embodiments, mobile bases are remotely dispatched, through use of a central server, by exoskeleton manufacturers, rental companies, hospitals, or sharing organizations (not unlike bike-sharing) to deliver EMODs or provide mobile bases to exoskeleton users in order to extend exoskeleton range or operating time or to provide for alternative mobility using the mobile base. In some embodiments, the mobile base uses sensors in order to move semi-autonomously, allowing the mobile base to search for charging stations or parking/storage locations without extensive user involvement. In some embodiments, the mobile base is in communication with charging locations directly or via a central server in order to facilitate mobile base movement and linkage to charging stations.

As an example of the sixth embodiment of the present invention, consider a disabled person using an exoskeleton and mobile base for personal mobility in a public place. This person may wish to use the mobile base for street mobility and the exoskeleton for mobility inside public structures, such as a restaurant. Through use of the device of the sixth embodiment, the person can decouple the exoskeleton from the base when he or she arrives at the restaurant and remotely park the mobile base at a location away from the seating area of the restaurant, such as a public charging station in a parking lot. When the person has finished eating at the restaurant, he or she could use the device and method of the sixth embodiment to summon the mobile base, now bearing fully charged EMODs, to his or her location and resume use of the mobile base.

Figure 8:
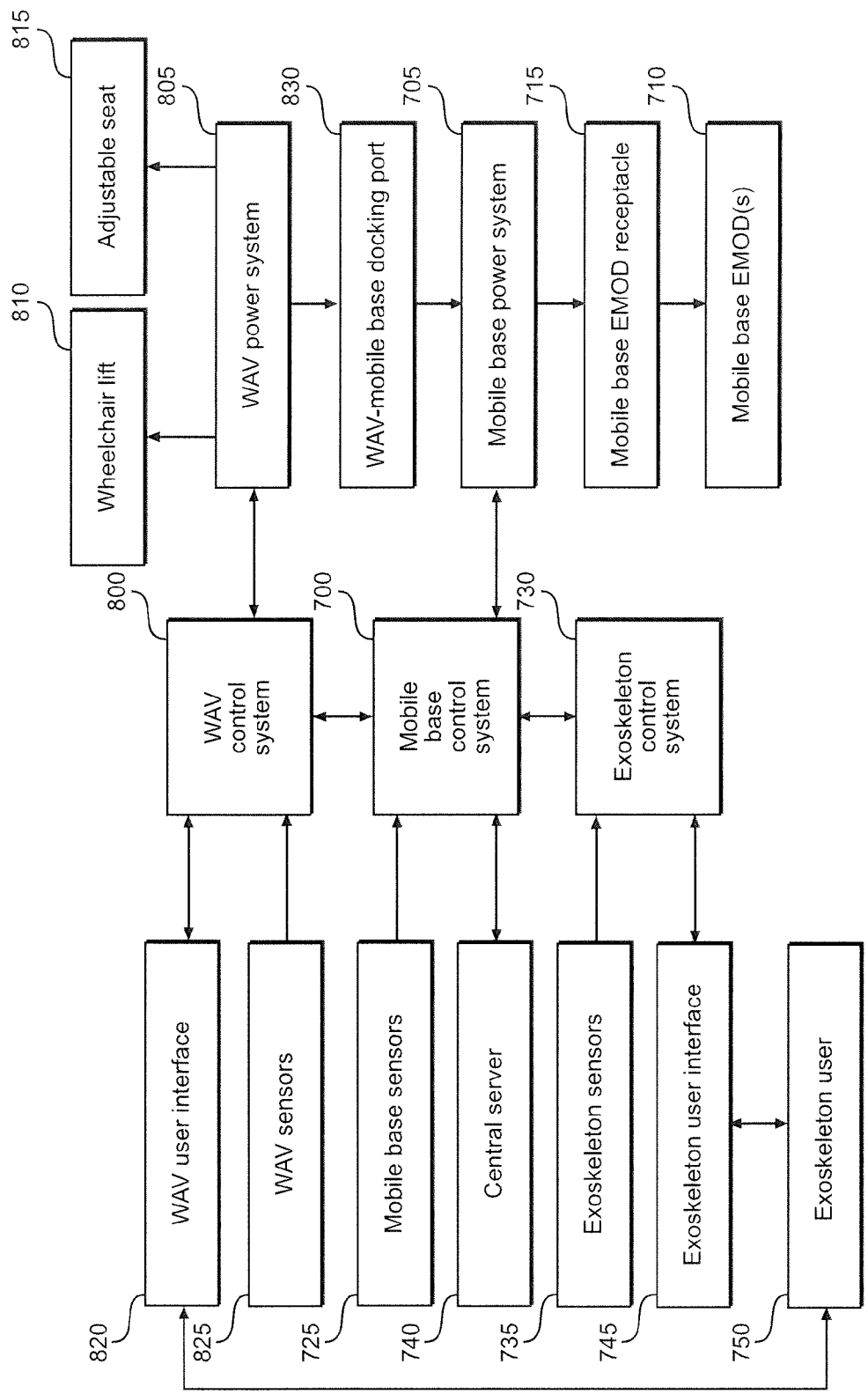
FIG. 8 is a schematic diagram of a seventh embodiment of the present invention, showing systems in communication to allow for integration of a combined mobile base and exoskeleton mobility system with wheelchair accessible vehicles ("WAVs")

With reference now to FIG. 8, a seventh embodiment of the present invention is illustrated in which a combined mobile base and exoskeleton mobility system is integrated so as to be both compatible and in communication with a wheelchair accessible vehicle (WAV). Specifically, a WAV control system 800 is in communication with and issues commands to a WAV power system 805, which provides power to a wheelchair lift 810 and an adjustable (driver's) seat 815. In addition, WAV control system 800 is in communication with mobile base control system 700 and a WAV user interface 820 and receives data from WAV sensors 825. Mobile base control system 700, which receives data from mobile base sensors 725, is in communication with central server 740 and exoskeleton control system 730. Exoskeleton control system 730 receives data from exoskeleton sensors 735 and is in communication with exoskeleton user interface 745. Exoskeleton user 750 receives data from and issues commands directly through exoskeleton user interface 745 and/or WAV user interface 820. In some embodiments, exoskeleton control system 730 and/or central server 740 are in direct communication with WAV control system 800. When the mobile base and the WAV are physically connected via a WAV-mobile base docking port 830, power from WAV power system 805 is transferred into mobile base EMOD(s) 710 through mobile base power system 705 and mobile base EMOD receptacle 715. Using these networked systems, the mobile base and exoskeleton mobility system can communicate with the WAV to adjust the position and shape of driver's seat 815 depending on whether exoskeleton user 750 is wearing the exoskeleton or not. Exoskeleton user 750 can maneuver the combined mobility system, in some embodiments with use of wheelchair lift 810, or other mechanisms known in the art of WAV design, into the WAV and either transfer into driver's seat 815 while leaving the exoskeleton connected to the mobile base or while wearing the exoskeleton and disconnecting from the mobile base. In some exoskeleton embodiments, the exoskeleton upper portion will protrude from the user's torso and pelvis area and will require additional room for ideal user positioning with respect to the WAV steering and driving controls.

As an example of the seventh embodiment of the present invention, consider a disabled person who uses an exoskeleton, mobile base, and WAV for personal mobility. The device and method of the seventh embodiment will allow the person to transport both the exoskeleton and mobile base in the WAV, as well as allow the WAV to charge EMODs mounted on the mobile base and connected systems while the mobile base is docked with the WAV.

With reference now to FIGS. 9A-E, an eighth embodiment of the present invention is shown in which an exoskeleton and user are mounted in an upright or standing position upon a mobile exoskeleton base. In this embodiment, the exoskeleton and mobile base docking assembly are operable between a coupled position, in which the exoskeleton is coupled to the mobile base, and a released position, in which the exoskeleton is separated from the mobile base. In one embodiment, shown in FIG. 9A, the coupling between the exoskeleton and mobile base takes place at the feet and lower portions of the exoskeleton. In particular, a user 900 is shown wearing an exoskeleton 905 and standing on a mobile base 910. A mobile base-exoskeleton docking interface 915 selectively couples a foot support 920 of exoskeleton 905 to mobile base 910. In addition, docking interface 915 includes a lower body interface structure 925, which selectively couples to a leg 930 of exoskeleton 905 at an attachment point 935. In another embodiment, shown in FIG. 9B, the mobile base docking assembly is coupled to the feet and intermediate portions of the exoskeleton. In particular, a mobile base-exoskeleton docking interface 915' selectively couples foot support 920 of exoskeleton 905 to mobile base 910. In addition, docking interface 915' includes a mid-body interface structure 940, which selectively couples to a hip 945 of exoskeleton 905 at attachment point 950.

Figure 9A:
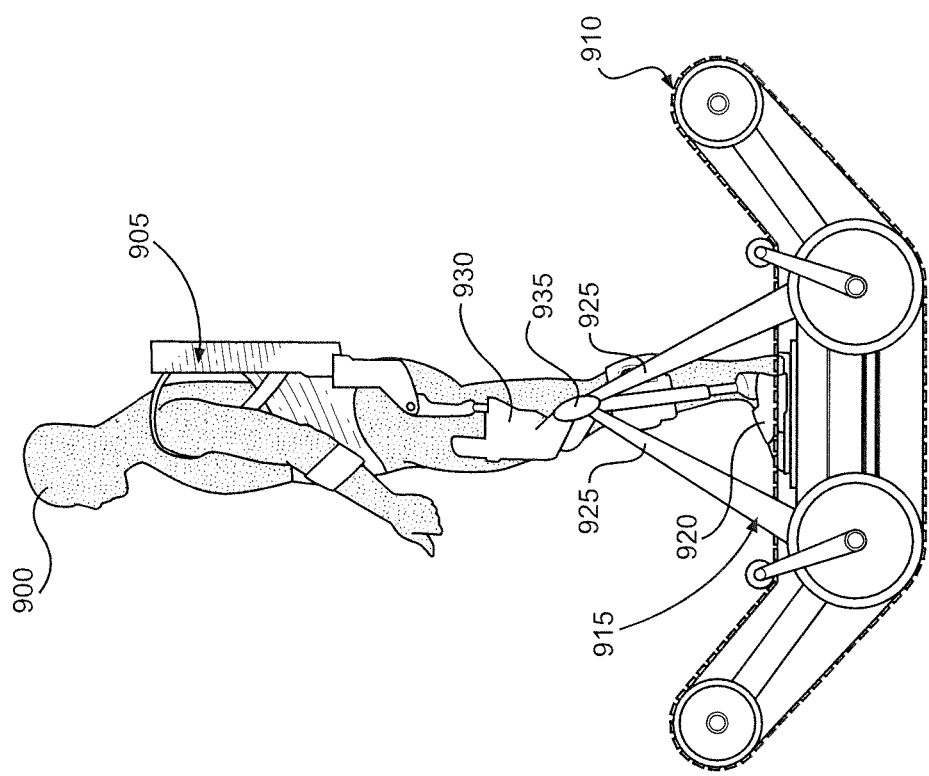
FIG. 9A is a side view of an exoskeleton and user standing on an upright mobility device constructed in accordance with an eighth embodiment of the present invention, with the exoskeleton selectively coupled to the mobile base at the legs and feet of the exoskeleton.
Figure 9B:
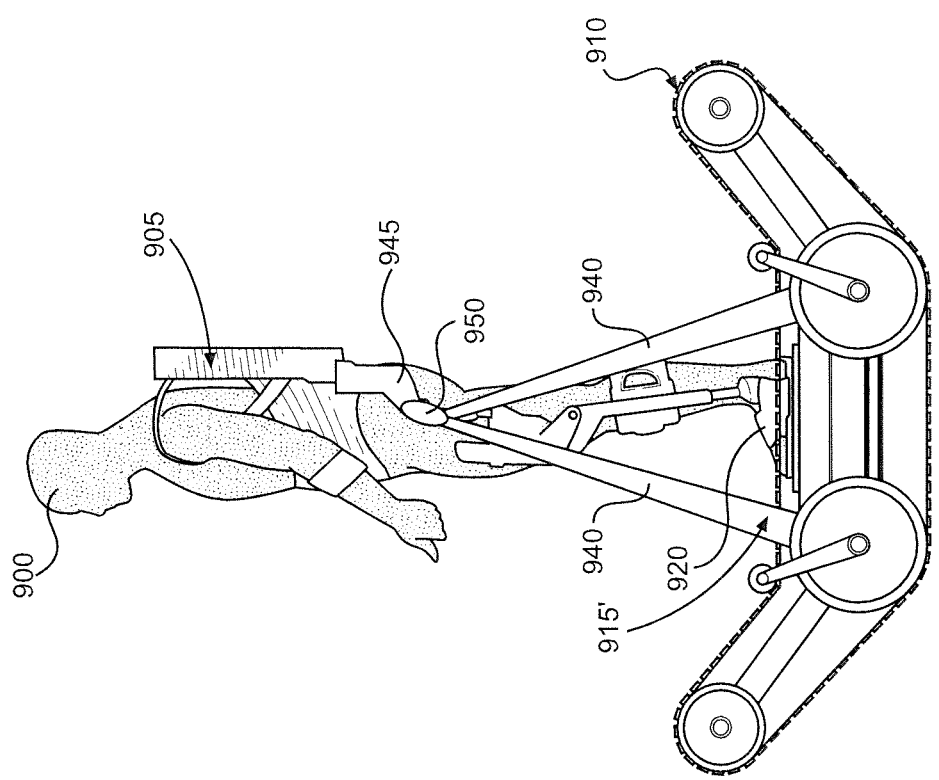
FIG. 9B is a side view of the exoskeleton and upright mobility device of the eighth embodiment, with the exoskeleton selectively coupled to the mobile base at the hips and feet of the exoskeleton.
Figure 9C:
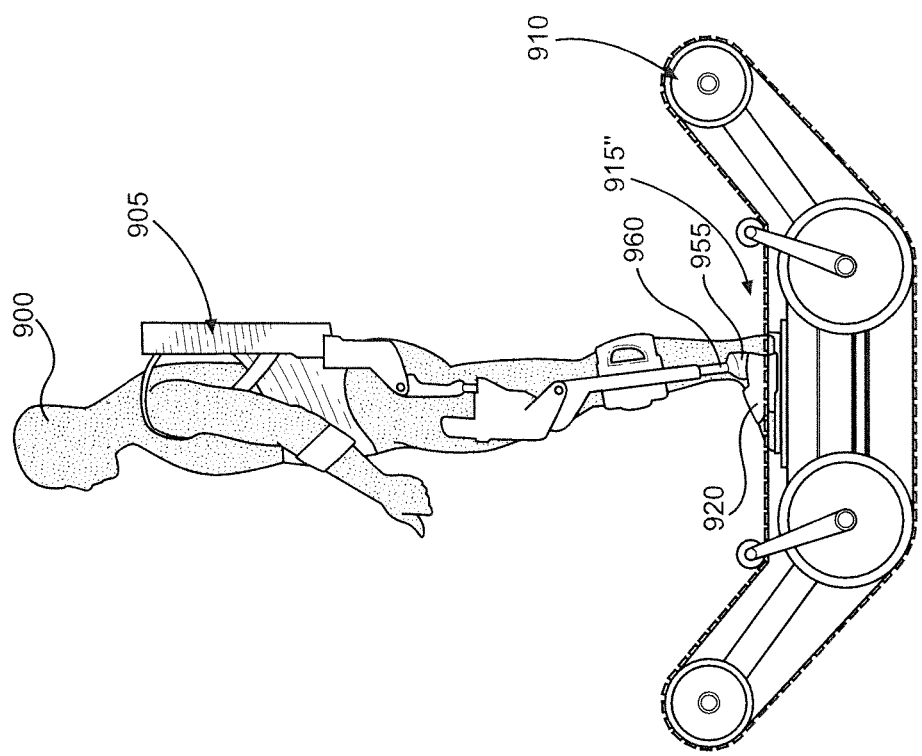
FIG. 9C is a side view of the exoskeleton and upright mobility device of the eighth embodiment, with the exoskeleton selectively coupled to the mobile base at the feet of the exoskeleton and having rigidized ankle joints.
Figure 9D:
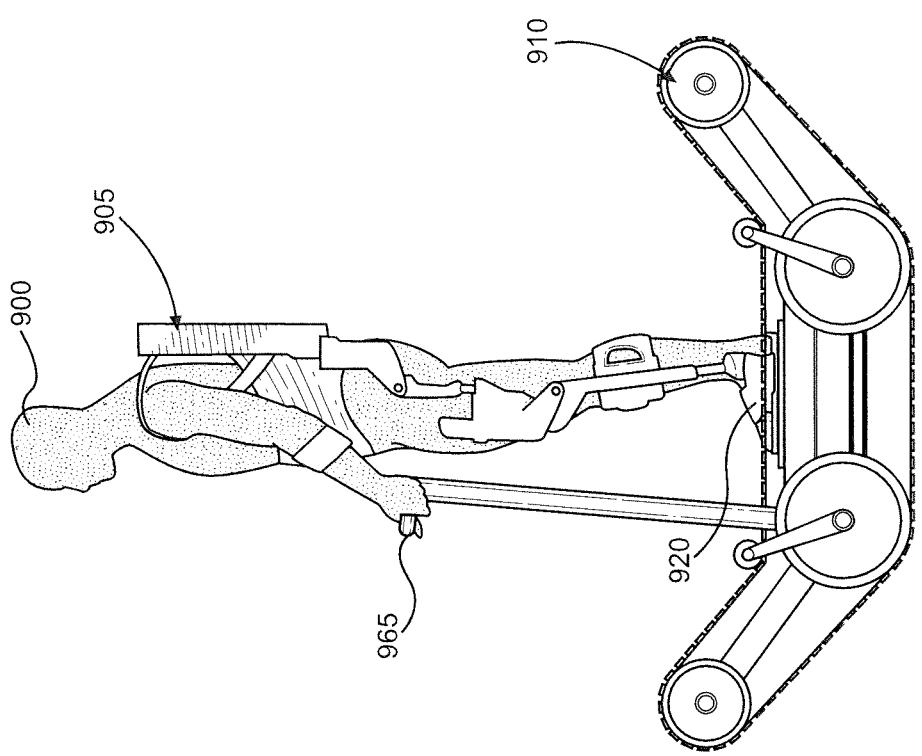
FIG. 9D is a side view of the exoskeleton and upright mobility device of the eighth embodiment, with the exoskeleton selectively coupled to the mobile base at the feet of the exoskeleton and the arms of the user.
Figure 9E:
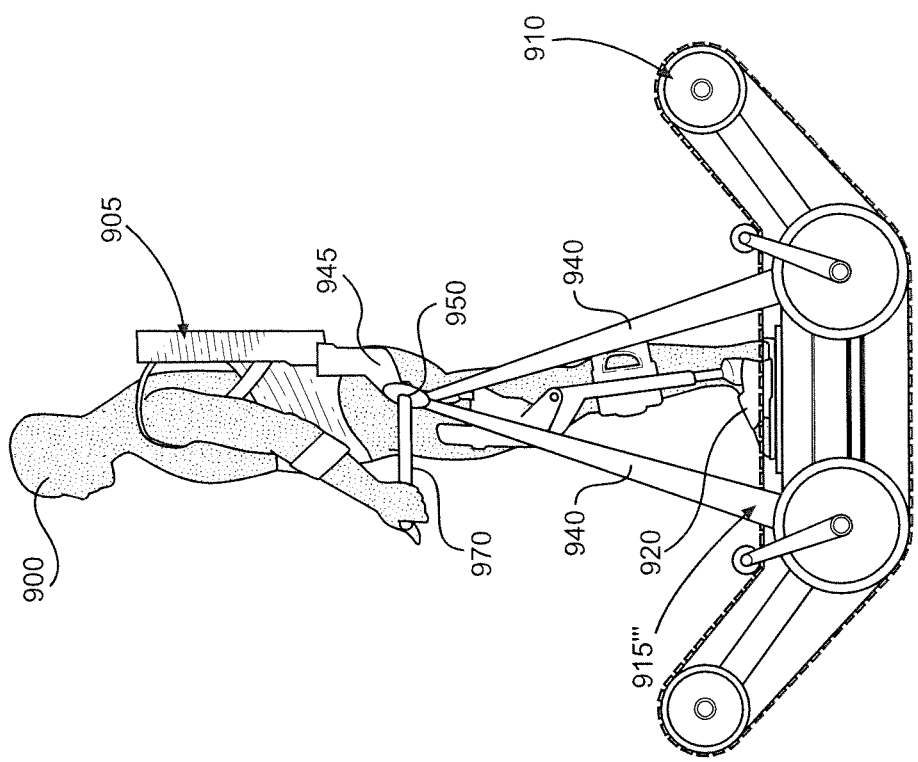
FIG. 9E is a side view of the exoskeleton and upright mobility device of the eighth embodiment, with the exoskeleton selectively coupled to the mobile base at the feet and hips of the exoskeleton and the arms of the user.

In a further embodiment, shown in FIG. 9C, the connection between the exoskeleton and mobile base takes place at the feet of the exoskeleton, with the ankle joint of the exoskeleton rigidized to prevent the angle of the exoskeleton from changing with respect to the mobile base. In particular, a mobile base-exoskeleton docking interface 915" selectively couples foot support 920 of exoskeleton 905 to mobile base 910, and a rigidized ankle joint 955 supports the position of exoskeleton 905 at an ankle 960. In another embodiment, shown in FIG. 9D, user 900 holds a handle 965 to aid in stabilization on mobile base 910. In yet another embodiment, shown in FIG. 9E, a mobile base-exoskeleton docking interface 915''' selectively couples foot support 920 of exoskeleton 905 to mobile base 910, and mid-body interface structure 940 selectively couples to hip 945 of exoskeleton 905 at attachment point 950. In addition, user 900 holds a handle 970 connected to attachment point 950.

In some embodiments, the wheeled or continuous track mobile base is wider than the exoskeleton and user standing width, increasing lateral (coronal plane) stability. Similarly, in some embodiments, the mobile base provides increased sagittal stability through use of a longer and/or heavier base. In either case, these arrangements provide a wider base of support and thus increase stability. Additionally, the different docking interface embodiments can be variously combined. In some embodiments, the attachments and supports between the exoskeleton and mobile base can take other forms, as is known in the art.

Additional concepts were developed that would enable and control angular changes between the exoskeleton and mobile base to keep the user and exoskeleton system center of gravity over the base of support on slopes and uneven terrain. In one embodiment, the connections between the exoskeleton and the mobile base have pivots near the foot supports of the exoskeleton. In addition, variable length connecting elements can be used, with these connecting elements having pivots where they attach to the exoskeleton lower and/or intermediate portions. In some embodiments, the variable length connecting elements are designed and controlled to provide the ideal stiffness, damping, and actuation capability by any of a plurality of means known in the art.

As an example of the eighth embodiment of the present invention, consider a person wearing an exoskeleton and mobile base for mobility purposes in a crowded environment or on uneven terrain. Use of the device of the eight embodiment will allow this person to make use of a mobile base, such as a tracked base, for improved mobility over uneven surfaces, with the advantage of maintaining a standing position to better view the crowd or terrain for navigational purposes. In addition, as standing up in an exoskeleton is a power-intensive step, the ability to uncouple from the mobile base without having to stand from a seated position reduces power consumption.

In some embodiments, the motorized mobile base is configured such that the motors and/or actuators are modular and can be shared between the exoskeleton and the mobile base as desired by the user. In some embodiments, the motors and/or actuators are upgradeable for different uses or future expandability. The sharing of these typically expensive subsystems would save weight and cost for the user. In one preferred embodiment, the modular motors and/or actuators are configured so that the user can connect and disconnect the modules independently without tools.

Additional concepts were developed that correspond to aspects of International Application No. PCT/CA2013/050836, except that the exoskeleton assembly advantageously comprises two segments instead of three. In one embodiment, an upper portion is arranged to be braced to the torso of a user, an intermediate portion is arranged to be braced to the thighs of the user, and a hip joint pivotally couples the intermediate portion to the upper portion. In another embodiment, an intermediate portion is arranged to be braced to the thighs of the user, a lower portion is arranged to be braced to the lower legs of the user, and a knee joint pivotally couples the lower leg portion to the intermediate portion.

In all of the various embodiments described above, the communication between the different systems can be wireless, making use of any wireless communication method known in the art. In addition, in some embodiments, the exoskeleton mobility base device can couple to the exoskeleton such that the mobile base transitions not into a seated position but rather into a laying position, such that the mobile base can act as a gurney or stretcher in order to transport a damaged exoskeleton or an injured or resting user in a hospital or battlefield setting. Furthermore, the various embodiments of the present invention can be combined, providing combined or additional benefits to persons who use an exoskeleton and a wheeled or tracked mobile base for mobility purposes.

Based on the above, it should be readily apparent that the present invention provides increased range and operating time for an exoskeleton by increasing the total power available to the exoskeleton. The present invention also makes this additional power mobile and available to the exoskeleton in locations distal to stationary sources of energy, such as wall outlets. In addition, the present invention provides for shared power systems between an exoskeleton and a wheeled base. Although described with reference to preferred embodiments, it should be readily understood that various changes or modifications could be made to the invention without departing from the spirit thereof. In general, the invention is only intended to be limited by the scope of the following claims.

The invention claimed is:

1. A mobility system comprising:
   an energy module;
   an exoskeleton including an exoskeleton energy module receptacle configured to receive the energy module; and
   a mobile base configured to transport the exoskeleton across a support surface, the mobile base including an exoskeleton support configured to support the exoskeleton on the mobile base and a mobile base energy module receptacle configured to receive the energy module, wherein a range of the exoskeleton is extendable by uncoupling the energy module from the mobile base energy module receptacle and coupling the energy module to the exoskeleton energy module receptacle.

2. The mobility system of claim 1, wherein at least one of the exoskeleton and mobile base energy module receptacles includes an automated energy module transfer mechanism configured to automatically transfer the energy module between the exoskeleton and mobile base energy module receptacles.

3. The mobility system of claim 1, wherein:
the exoskeleton energy module receptacle is configured to automatically and selectively couple the energy module thereto; and
the mobile base energy module receptacle is configured to automatically and selectively couple the energy module thereto.

4. The mobility system of claim 3, wherein:
the exoskeleton further includes an exoskeleton control system configured to control coupling of the energy module to the exoskeleton energy module receptacle; and
the mobile base further includes a mobile base control system configured to control coupling of the energy module to the mobile base energy module receptacle.

5. The mobility system of claim 4, wherein the exoskeleton and mobile base control systems are configured to coordinate whether the energy module is coupled to the exoskeleton energy module receptacle or the mobile base energy module receptacle.

6. The mobility system of claim 5, wherein:
the exoskeleton is configured to determine a remaining power of the energy module when the energy module is received in the exoskeleton energy module receptacle;
the mobile base is further configured to determine the remaining power of the energy module when the energy module is received in the mobile base energy module receptacle; and
the exoskeleton and mobile base control systems are configured to coordinate whether the energy module is coupled to the exoskeleton energy module receptacle or the mobile base energy module receptacle based on the remaining power of the energy module.

7. The mobility system of claim 1, wherein:
the exoskeleton further includes an exoskeleton power system;
the exoskeleton further includes actuators configured to cause movement of the exoskeleton;
the exoskeleton energy module receptacle is configured to transfer power from the energy module to the exoskeleton power system when the energy module is received in the exoskeleton energy module receptacle; and
the exoskeleton power system is configured to transfer power to the actuators.

8. The mobility system of claim 7, wherein:
the mobile base further includes a mobile base power system;
the mobile base further includes propulsive motors configured to cause movement of the mobile base across the support surface;
the mobile base energy module receptacle is configured to transfer power from the energy module to the mobile base power system when the energy module is received in the mobile base energy module receptacle; and
the mobile base power system is configured to transfer power to the propulsive motors.

9. The mobility system of claim 8, wherein:
the mobile base is further configured to receive power from an external energy supply; and
the mobile base energy module receptacle is further configured to transfer power to the energy module when the energy module is received in the mobile base energy module receptacle, thereby charging the energy module.

10. The mobility system of claim 9, wherein:
the exoskeleton is configured to receive power from the mobile base; and
the exoskeleton energy module receptacle is further configured to transfer power to the energy module when the energy module is received in the exoskeleton energy module receptacle, thereby charging the energy module.

11. The mobility system of claim 10, wherein the exoskeleton is further configured to transfer power to the mobile base.

12. The mobility system of claim 9, wherein the mobile base further includes a docking interface configured to connect to a docking port, wherein the docking port is configured to receive power from the external energy supply and transfer the energy to the mobile base through the docking interface when the docking interface is connected to the docking port.

13. The mobility system of claim 9, wherein the external energy supply is an electric generator mounted on the mobile base.

14. The mobility system of claim 1, further comprising a central server, wherein the mobile base further includes a mobile base control system configured to receive data from the central server and cause movement of the mobile base based on the data.

15. The mobility system of claim 1, wherein:
the exoskeleton further includes an exoskeleton control system; and
the mobile base further includes a mobile base control system configured to receive data from the exoskeleton control system and cause movement of the mobile base based on the data.

16. The mobility system of claim 15, wherein:
the exoskeleton further includes a user interface configured to receive commands from a user and pass the commands to the mobile base control system through the exoskeleton control system; and
the mobile base control system is configured to cause movement of the mobile base based on the commands.

17. The mobility system of claim 1, further comprising a wheelchair accessible vehicle including a wheelchair accessible vehicle power system and a docking port configured to connect the mobile base to the wheelchair accessible vehicle, wherein:
the mobile base further includes a mobile base power system
the docking port is configured to transfer power from the wheelchair accessible vehicle power system to the mobile base power system; and
the mobile base energy module receptacle is further configured to transfer power from the mobile base power system to the energy module when the energy module is received in the mobile base energy module receptacle, thereby charging the energy module.

18. The mobility system of claim 1, wherein the energy module is a battery.

19. The mobility system of claim 1, wherein the exoskeleton is an ambulatory exoskeleton including a foot support, a lower leg support, an upper leg support, a leg brace, a torso brace, a knee actuator and a hip actuator.

20. The mobility system of claim 19, wherein the ambulatory exoskeleton further includes a back support, and the back support includes the exoskeleton energy module receptacle.

21. The mobility system of claim 1, wherein the mobile base further includes a wheel configured to contact the support surface, and rotation of the wheel causes movement of the mobile base across the support surface.

22. The mobility system of claim 1, wherein the mobile base further includes a track configured to contact the support surface, and movement of the track causes movement of the mobile base across the support surface.

23. The mobility system of claim 22, wherein the mobile base is configured to transport the exoskeleton across the support surface while the exoskeleton is in a standing position.

24. The mobility system of claim 1, wherein:
the exoskeleton energy module receptacle is configured to receive a plurality of energy modules; and
the mobile base energy module receptacle is configured to receive a plurality of energy modules.

25. A method of extending a range of an exoskeleton with a mobile base including an exoskeleton support configured to support the exoskeleton on the mobile base, the mobile base being configured to transport the exoskeleton across a support surface, the method comprising:
uncoupling an energy module from a mobile base energy module receptacle of the mobile base; and
coupling the energy module to an exoskeleton energy module receptacle of the exoskeleton.

26. The method of claim 25, further comprising automatically transferring the energy module between the exoskeleton and mobile base energy module receptacles with an automated energy module transfer mechanism.

27. The method of claim 25, wherein:
uncoupling the energy module from the mobile base energy module receptacle includes automatically uncoupling the energy module from the mobile base energy module receptacle with the mobile base energy module receptacle; and
coupling the energy module to the exoskeleton energy module receptacle includes automatically coupling the energy module to the exoskeleton energy module receptacle with the exoskeleton energy module receptacle.

28. The method of claim 27, further comprising:
controlling coupling of the energy module to the mobile base energy module receptacle with a mobile base control system of the mobile base; and
controlling coupling of the energy module to the exoskeleton energy module receptacle with an exoskeleton control system of the exoskeleton.

29. The method of claim 28, further comprising coordinating whether the energy module is coupled to the mobile base energy module receptacle or the exoskeleton energy module receptacle with the exoskeleton and mobile base control systems.

30. The method of claim 29, further comprising:
determining a remaining power of the energy module with the exoskeleton or the mobile base; and
coordinating whether the energy module is coupled to the mobile base energy module receptacle or the exoskeleton energy module receptacle based on the remaining power of the energy module.

31. The method of claim 25, wherein the exoskeleton further includes an exoskeleton power system and actuators configured to cause movement of the exoskeleton, the method further comprising:
transferring power from the energy module to the exoskeleton power system with the exoskeleton energy module receptacle; and
transferring power to the actuators with the exoskeleton power system.

32. The method of claim 31, wherein the mobile base further includes a mobile base power system and propulsive motors configured to cause movement of the mobile base across the support surface, the method further comprising:
transferring power from the energy module to the mobile base power system with the mobile base energy module receptacle; and
transferring power to the propulsive motors with the mobile base power system.

33. The method of claim 32, further comprising:
transferring power from an external energy supply to the mobile base; and
transferring power to the energy module with the mobile base energy module receptacle, thereby charging the energy module.

34. The method of claim 33, further comprising:
transferring power from the mobile base to the exoskeleton; and
transferring power to the energy module with the exoskeleton energy module receptacle, thereby charging the energy module.

35. The method of claim 34, further comprising transferring power from the exoskeleton to the mobile base.

36. The method of claim 33, wherein the mobile base further includes a docking interface configured to connect to a docking port, the method further comprising:
transferring power from the external energy supply to the mobile base through the docking interface with the docking port.

37. The method of claim 33, wherein transferring power from the external energy supply to the mobile base includes transferring power to the mobile base from an electric generator mounted on the mobile base.

38. The method of claim 25, further comprising:
transferring data from a central server to a mobile base control system of the mobile base; and
causing movement of the mobile base based on the data.

39. The method of claim 25, further comprising:
transferring data from an exoskeleton control system of the exoskeleton to a mobile base control system of the mobile base; and
causing movement of the mobile base based on the data.

40. The method of claim 39, further comprising:
receiving commands from a user with a user interface of the exoskeleton;
passing the commands to the mobile base control system through the exoskeleton control system; and
causing movement of the mobile base based on the commands.

41. The method of claim 25, further comprising:
transferring power from a wheelchair accessible vehicle power system of a wheelchair accessible vehicle to a mobile base power system of the mobile base with a docking port of the wheelchair accessible vehicle; and
transferring power from the mobile base power system to the energy module with the mobile base energy module receptacle, thereby charging the energy module.

42. The method of claim 25, wherein the energy module constitutes a first energy module, the method further comprising:
- uncoupling a second energy module from the exoskeleton energy module receptacle; and
- coupling the second energy module to the mobile base energy module receptacle.

43. The method of claim 25, further comprising:
- transferring power to the energy module while the energy module is coupled to the mobile base energy module receptacle; and
- transferring power from the energy module to the exoskeleton while the energy module is coupled to the exoskeleton energy module receptacle.

* * * * *